(12) United States Patent
Kawakami et al.

(10) Patent No.: US 7,672,065 B2
(45) Date of Patent: Mar. 2, 2010

(54) LENS SYSTEM AND PROJECTOR UTILIZING THE SAME

(75) Inventors: Etsuro Kawakami, Akishima (JP); Yasuyuki Tejima, Tokyo (JP)

(73) Assignee: Casio Computer Co., Ltd., Tokyo (JP)

(*) Notice: Subject to any disclaimer, the term of this patent is extended or adjusted under 35 U.S.C. 154(b) by 0 days.

(21) Appl. No.: 11/952,303

(22) Filed: Dec. 7, 2007

(65) Prior Publication Data

US 2008/0137211 A1   Jun. 12, 2008

(30) Foreign Application Priority Data

Dec. 12, 2006   (JP) .............................. 2006-334017

(51) Int. Cl.
G02B 13/02 (2006.01)
(52) U.S. Cl. ..................... 359/749; 359/753
(58) Field of Classification Search ................ 359/749, 359/750, 751, 752, 753
See application file for complete search history.

(56) References Cited

U.S. PATENT DOCUMENTS

| | | | |
|---|---|---|---|
| 6,671,102 B2 | 12/2003 | Wada | |
| 6,989,946 B2 | 1/2006 | Kobayashi et al. | |
| 7,057,825 B2 * | 6/2006 | Kobayashi | 359/651 |
| 7,390,098 B2 | 6/2008 | Wada | |
| 7,486,450 B2 * | 2/2009 | Kawakami et al. | 359/781 |
| 2008/0130142 A1 | 6/2008 | Kawakami et al. | |
| 2008/0137212 A1 | 6/2008 | Kawakami et al. | |
| 2008/0239514 A1 | 10/2008 | Kawakami et al. | |

FOREIGN PATENT DOCUMENTS

| JP | 05-203872 A | 8/1993 |
|---|---|---|
| JP | 2002-075202 A | 3/2002 |
| JP | 2002-365534 A | 12/2002 |
| JP | 2003-121736 A | 4/2003 |
| JP | 2003-202493 A | 7/2003 |
| JP | 2003-287676 A | 10/2003 |
| JP | 2005-128487 A | 5/2005 |
| JP | 2005-181993 A | 7/2005 |
| JP | 2005-215310 A | 8/2005 |
| JP | 2008-139521 A | 6/2008 |
| JP | 2008-145801 A | 6/2008 |
| JP | 2008-145802 A | 6/2008 |

OTHER PUBLICATIONS

Japanese Office Action (and English translation thereof) dated Oct. 21, 2008 issued in counterpart Japanese Application No. 2006-334017.
Japanese Office Action (and English translation thereof) dated Oct. 21, 2008, issued for counterpart Japanese Application No. 2006-334018 of related U.S. Appl. No. 11/952,348.
Related U.S. Appl. No. 11/952,348; Filed: Dec. 7, 2007; Inventors: Etsuro Kawakami et al; Title: Lens System and Projector Utilizing the Same.
Japanese Office Action (and English translation thereof) dated Oct. 21, 2008, issued for counterpart Japanese Application No. 2006-325091 of related U.S. Appl. No. 11/982,814.
Related U.S. Appl. No. 12/001,873, filed Dec. 13, 2007, published as US 2008/0239514 on Oct. 2, 2008.

* cited by examiner

*Primary Examiner*—Scott J Sugarman
(74) *Attorney, Agent, or Firm*—Frishauf, Holtz, Goodman & Chick, P.C.

(57) ABSTRACT

A high-performance lens system includes lens elements of small diameters for projecting enlarged images from light valves (mainly Digital Micromirror Devices (DMDs)) for forming images by changing reflecting directions of light. The lens system includes, sequentially in order from a magnifying side, a first lens group which makes up a substantially afocal optical system as a whole and a second lens group having a positive refractive power as a whole. Depending on the application a third lens group made up of a single positive lens element is provided in the vicinity of the light valve on a contracting side of the second lens group.

20 Claims, 17 Drawing Sheets

LENS SYSTEM AND PROJECTOR UTILIZING THE SAME

CROSS-REFERENCE TO RELATED APPLICATION

This application is based upon and claims the benefit of priority from the prior Japanese Patent Application No. 2006-334017, filed on Dec. 12, 2006, the entire contents of which are incorporated herein by reference.

BACKGROUND OF THE INVENTION

1. Field of the Invention

The present invention relates to a lens system including lens elements of small diameters for projecting on to a screen in an enlarged fashion images from light valves such as mainly DMDs (Digital Micromirror Devices) for forming images by changing reflecting directions of light.

2. Description of the Related Art

Projectors utilizing DMDs as light valves are considered as being more advantageous in miniaturization than those utilizing other image forming methods. Currently, compact portable projectors have been well accepted by many users, and especially so are data projectors which are convenient for presentations.

In projectors which are developed for use as portable ones, reducing the thickness dimension is of importance, and it can be said that the reduction in thickness is one of the most important factors for projectors which are in many cases carried together with note-type personal computers or the like for combined use. As an example of a means for solving the problem, for example, the Japanese Unexamined Patent Publication No. 2003-121736 describes a design method for reducing the effective diameter of a projection lens.

SUMMARY OF THE INVENTION

The present invention has been made in view of the situations and an objective thereof is to realize a lens system made up of lens elements of small diameters, so as to provide a projector incorporating the lens system so realized which is thus thin enough for convenient carriage and which can project an enlarged image with high image quality even in a limited space.

According to a preferred aspect of the invention, there is provided a lens system including, sequentially in that order from a magnifying side, a first lens group which makes up a substantially afocal optical system as a whole and a second lens group having a positive refractive power as a whole.

The first lens group is configured to include, sequentially in that order from a magnifying side, a first sub-lens group or 1a lens group having a negative refractive power as a whole and a second sub-lens group or 1b lens group having a positive refractive power as a whole, and the second lens group is configured to include, sequentially in that order from a magnifying side, a first sub-lens group or 2a lens group having a negative refractive power as a whole and a second sub-lens group or 2b lens group having a positive refractive power as a whole.

In addition, this lens system is such that the following conditional expression (1) is satisfied with respect to a power set for the first lens group, the following conditional expression (2) is satisfied with respect to an afocal magnification set for the first lens group, the following conditional expression (3) is satisfied with respect to a power set for the 1a lens group, the following conditional expression (4) is satisfied with respect to a power set for the 2a lens group, the following conditional expression (5) is satisfied with respect to a power set for the 2b lens group, and the following conditional expression (6) is satisfied with respect to a thickness dimension at an optical axis of the first lens group.

$$-0.3 \leq f/f_I \leq 0.3 \tag{1}$$

$$0.35 \leq h_{IE}/h_{IX} \leq 0.45 \tag{2}$$

$$-1.4 \leq f/f_{Ia} \leq 0.8 \tag{3}$$

$$-0.5 \leq f/f_{IIa} \leq 0.1 \tag{4}$$

$$0.35 \leq f/f_{IIb} \leq 0.65 \tag{5}$$

$$1.9 \leq T_I/f \leq 2.5 \tag{6}$$

where, f: Composite focal length of the whole lens system;

$f_I$: Composite focal length of the first lens group;

$h_{IE}$: Height of paraxial ray incident on to a magnifying-side surface of a lens element which is disposed outermost on a magnifying side of the first lens group;

$h_{IX}$: Height of paraxial ray emerging from a contracting-side surface of a lens element which is disposed outermost on a contracting side of the first lens group;

$f_{Ia}$: Composite focal length of the 1a lens group which makes up the first lens group;

$f_{IIa}$: Composite focal length of the 2a lens group which makes up the second lens group;

$f_{IIb}$: Composite focal length of the 2b lens group which makes up the second lens group; and $T_I$: Distance on the optical axis between the magnifying-side surface of the lens element which is disposed outermost on the magnifying side of the first lens group to the contracting-side surface of the lens element which is disposed outermost on the contracting side of the first lens group.

DESCRIPTION OF THE PREFERRED EMBODIMENTS

Figure 1:
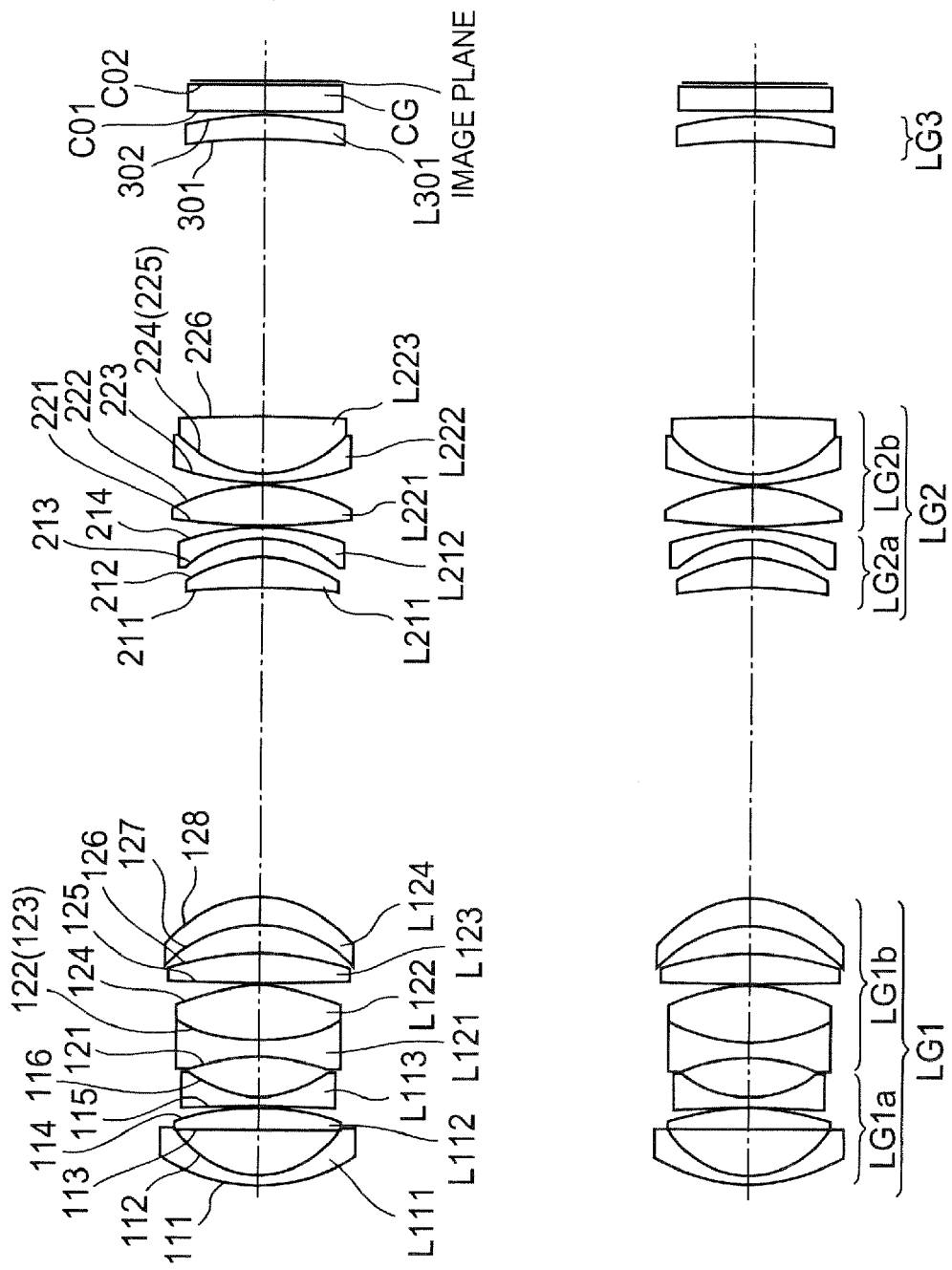
FIG. 1 is a drawing showing the configuration of lens elements of a lens system according to a first embodiment of the invention.

Hereinafter, embodiments of the invention will be described by reference to specific numerical examples. In Embodiments 1 to 8 below, a lens system is configured to include, sequentially in that order from a magnifying side, a first lens group LG1 which makes up a substantially afocal optical system as a whole and a second lens group LG2 having a positive refractive power as a whole.

The first lens group LG1 is configured to include, sequentially in that order from a magnifying side, a first sub-lens group or 1a lens group LG1a having a negative refractive power as a whole and a second sub-lens group or 1b lens group LG1b having a positive refractive power as a whole.

The 1a lens group LG1a is configured to include three lens elements which are, sequentially in that order from a magnifying side, a lens element (lens element designated as L111, a magnifying-side surface as 111, a contracting-side surface as 112) which is formed into a meniscus shape which is convex on a magnifying side thereof and which has a negative refractive power (hereinafter, referred to as a negative lens element), a lens element (lens element designated as L112, a magnifying-side surface as 113, a contracting-side surface as 114) which has a positive refractive power (hereinafter, referred to as a positive lens element), and a negative lens element (lens element designated as L113, a magnifying-side surface as 115, a contracting-side surface as 116).

The 1b lens group LG1b, which follows the 1a lens group LG1a, is configured to include four lens elements in total, that is, a negative lens element (lens element designated as L121, a magnifying-side surface as 121, a contracting-side surface as 122), a positive lens element (lens element designated as L122, a magnifying-side surface as 123, a contracting-side surface as 124, however, in the event that the lens element constitutes a cemented lens element together with the preceding negative lens element, the lens surface 122 and the lens surface 123 constitute the same lens surface), a positive lens element (lens element designated as L123, a magnifying-side surface as 124, a contracting-side surface as 125), and a positive lens element (lens element designated as L124, a magnifying-side surface as 126, a contracting-side surface as 127) which has a meniscus shape which is convex on a contracting side thereof.

The second lens group LG2 is configured to include, sequentially in that order from a magnifying side, a first sub-lens group or 2a lens group LG2a having a negative refractive power as a whole and a second sub-lens group or 2b lens group LG2b having a positive refractive power as a whole.

The 2a lens group LG2a is configured to include two lens elements, that is, a positive lens element (lens element designated as L211, a magnifying-side surface as 211, a contracting-side surface as 212) and a negative lens element (lens element designated as L212, a magnifying-side surface as 213, a contracting-side surface as 214), or configured to include three lens elements in total, that is, a positive lens element (lens element designated as L211, a magnifying-side surface as 211, a contracting-side surface as 212), a negative lens element (lens element designated as L212, a magnifying-side surface as 213, a contracting-side surface as 214, however, in the event that the lens element constitutes a cemented lens element together with the preceding positive lens element, the lens surface 212 and the lens surface 213 constitute the same lens surface), and a positive lens element (lens element designated as L213, a magnifying-side surface as 215, a contracting-side surface as 216, however, in the event that the lens element constitutes a cemented lens element together with the preceding negative lens element, the lens surface 214 and the lens surface 215 constitute the same lens surface).

In addition, the 2b lens group LG2b is configured to include three lens elements in total, that is, a positive lens element (lens element designated as L221, a magnifying-side surface as 221, a contracting-side surface as 222), a negative lens element (lens element designated as L222, a magnifying-side surface as 223, a contracting-side surface as 224), and a positive lens element (lens element designated as L223, a magnifying-side surface as 225, a contracting-side surface as 226, however, in the event that the lens element constitutes a cemented lens element together with the preceding negative lens element, the lens surface 224 and the lens surface 225 constitute the same lens surface).

Additionally, the 1a lens group LG1a and the 1b lens group LG1b, which make up the first lens group LG1, are fixed to a first lens barrel, and the 2a lens group LG2a and the 2b lens group LG2b, which make up the second lens group LG2, are fixed to a second lens barrel.

In addition, depending upon applications, the lens system is configured to include a third lens group LG3 which is made up of a positive lens element (lens element designated as L301, a magnifying-side surface designated as 301, a contracting-side surface designated as 302) which is disposed in the vicinity of a light valve such as a DMD on the contracting side of the second lens group LG2. A cover glass CG (a magnifying-side surface as C01, a contracting-side surface as C02), which is a constituent component of the light valve such as the DMD, is provided between a contracting side of the third lens group LG3 and a surface of the light valve with a slight airspace provided therebetween.

In this way, according to the embodiment, there is provided a lens system comprising, sequentially in that order from a magnifying-side, a first lens group which makes up a substantially afocal optical system as a whole and a second lens group having a positive refractive power as a whole, the first lens group being configured to include, sequentially in that order from a magnifying side, a first sub-lens group or 1a lens group having a negative refractive power as a whole and a second sub-lens group or 1b lens group having a positive refractive power as a whole, the second lens group being configured to include, sequentially in that order from a magnifying side, a first sub-lens group or 2a lens group having a negative refractive power as a whole and a second sub-lens group or 2b lens group having a positive refractive power as a whole, wherein, the following conditional expression (1) is satisfied with respect to a power set for the first lens group, the following conditional expression (2) is satisfied with respect to an afocal magnification set for the first lens group, the following conditional expression (3) is satisfied with respect to a power set for the 1a lens group, the following conditional expression (4) is satisfied with respect to a power set for the 2a lens group, the following conditional expression (5) is satisfied with respect to a power set for the 2b lens group, and the following conditional expression (6) is satisfied with respect to a thickness dimension at an optical axis of the first lens group;

$$-0.3 \leq f/f_I \leq 0.3 \quad (1)$$

$$0.35 \leq h_{IE}/h_{IX} \leq 0.45 \quad (2)$$

$$-1.4 \leq f/f_{Ia} \leq 0.8 \quad (3)$$

$$-0.5 \leq f/f_{IIa} \leq 0.1 \quad (4)$$

$$0.35 \leq f/f_{IIb} \leq 0.65 \quad (5)$$

$$1.9 \leq T_I/f \leq 2.5 \quad (6)$$

where, f: Composite focal length of the whole lens system;

$f_I$: Composite focal length of the first lens group;

$h_{IE}$: Height of paraxial ray incident on to a magnifying-side surface of a lens element which is disposed outermost on a magnifying side of the first lens group;

$h_{IX}$: Height of paraxial ray emerging from a contracting-side surface of a lens element which is disposed outermost on a contracting side of the first lens group;

$f_{Ia}$: Composite focal length of the 1a lens group which makes up the first lens group;

$f_{IIa}$: Composite focal length of the 2a lens group which makes up the second lens group;

$f_{IIb}$: Composite focal length of the 2b lens group which makes up the second lens group; and $T_I$: Distance on the optical axis between the magnifying-side surface of the lens element which is disposed outermost on the magnifying side of the first lens group to the contracting-side surface of the lens element which is disposed outermost on the contracting side of the first lens group.

The conditional expression (1) specifies an appropriate power distribution to the first lens group which makes up the substantially afocal optical system as a whole. In the event that an upper limit is surpassed, the positive power of the first lens group becomes too large, and the back focus becomes short. In the event that a lower limit is surpassed, the negative power of the first lens group becomes too large, and the load borne by the rear group increases, whereby the aberrations are deteriorated.

In addition, the conditional expression (2) specifies the magnification of the first lens group which functions as a wide converter, and in the event that an upper limit thereof is surpassed, the magnification becomes too high, whereby the load in terms of aberrations borne by the front group becomes too large, resulting in a deteriorated performance, whereas a lower limit is surpassed, the magnification decreases, which is disadvantageous in wide-angle setting.

The conditional expression (3) is associated with the negative power set for the 1a lens group which corresponds to a dispersion system in the first lens group which makes up the wide converter. In the event that an upper limit is surpassed, the negative power becomes weak, whereby the focal length of the whole converter system is increased, and the system has to be enlarged. In the event that a lower limit is surpassed, the negative power becomes too large, which is advantageous in miniaturization but is disadvantageous in correcting the aberrations.

The following conditional expressions (4), (5) are associated with the power configuration of the second lens group. Although the second lens group, which makes up the rear group, has the positive power as the whole system, the second lens group is characterized in that since the 2a lens group, which is situated on the magnifying side, constitutes the dispersion system, the 2a lens group is configured to have the negative power as a whole, and since the 2b lens group, which is situated on the contracting side, constitutes a condenser system, the 2b lens group is configured to have the positive power as a whole.

The conditional expression (4) specifies the negative power of the 2a lens group, and in the event that an upper limit is surpassed, the negative power becomes small, whereby the back focus is shortened. On the contrary, in the event that a lower limit is surpassed, the negative power becomes too large, giving rise to enlargement of the system, and the aberrations are increased by the negative power which now becomes excessive.

The conditional expression (5), which follows the expression (4), specifies the positive power of the 2b lens group so as to obtain an appropriate size and performance for the whole lens system together with the conditional expression (4). In the event that an upper limit is surpassed, the positive power becomes immoderate, and the performance is decreased and the back focus is shortened. In the event that a lower limit is surpassed, the positive power becomes small, giving rise to enlargement of the system.

The conditional expression (6) specifies the thickness of the first lens group in the optical axis direction. Functioning as the afocal converter, the first lens group needs to keep a certain axial thickness for correction of the aberrations, although it depends upon the afocal magnification thereof. In the event that an upper limit is surpassed, although it is advantageous in terms of performance, the system has to be enlarged, whereas in the event that a lower limit is surpassed, although it is advantageous in terms of miniaturization, the powers of the 1a lens group and the 1b lens group become too large, whereby the aberrations are increased.

In addition, the 1a lens group, which makes up the first lens group, is configured to include three lens elements, sequentially in that order from a magnifying side, a negative lens element which has a meniscus shape which is convex on a magnifying side thereof, a positive lens element, and a negative lens element, and it is preferable that the following conditional expression (7) is satisfied with respect to the shape of a contracting-side surface of the lens element which is disposed outermost on the magnifying side of the 1a lens group, the following conditional expression (8) is satisfied with respect to the dispersion properties of a glass material used for each of the lens elements which make up the 1a lens group, and the following expression (9) is satisfied with respect to the refractive index of a glass material used for each of the lens elements which make up the 1a lens group.

$$0.7 \leq R_{Ia2}/f \leq 1.3 \quad (7)$$

$$10 \leq V_{IaN} - V_{Iap} \quad (8)$$

$$1.7 \leq N_{Ia} \quad (9)$$

where, $R_{Ia2}$: Radius of curvature of the contracting-side surface of the lens element which is disposed outermost on the magnifying side of the 1a lens group;

$V_{IaN}$: Mean value of Abbe numbers of the negative lens element which makes up the 1a lens group;

$V_{IaP}$: Mean value of Abbe numbers of the positive lens element which makes up the 1a lens group; and $N_{Ia}$: Mean value of refractive indices of the lens elements which make up the 1a lens group relative to the d line.

The conditional expression (7) is associated with the shape of the contracting-side surface of the lens element which is disposed outermost on the magnifying side of the 1a lens group, and the contracting-side surface is formed substantially into a concentric shape relative to a bundle of rays on the magnifying side while being made to have a strong power, and basically, the concentric shape so formed is made to suppress the generation of aberrations. Consequently, in the event that a lower limit is surpassed, spherical aberration and comatic aberration are overcorrected, whereas in the event that an upper limit is surpassed, they become undercorrected, on the contrary.

The conditional expression (8) is an achromatic condition which constitutes a basic factor of the first lens group and is a conditional expression for basically decreasing the quantity of chromatic aberration to be generated and maintaining a proper achromatic condition. Namely, the conditional expression expresses the balance of dispersion properties of a glass material used for the 1a lens group which bears a large negative power in the first lens group having a strong negative power, and it is important to suppress the basic chromatic aberration being generated in the interior of the lens group to a small level by satisfying this conditional expression. By selecting glass materials for these lens elements under the condition specified by the conditional expression (8), a suitable power distribution can be realized, and the chromatic aberration can be corrected properly. In the event that a lower limit is surpassed, the power of each lens element becomes excessive for correction of the chromatic aberration, whereby the aberrations are worsened.

The conditional expression (9) is associated with the characteristics of the refractive index of the 1a lens group which has the particularly strong negative power. In order to mitigate the intensity of curvature of acquiring the strong negative power, it is inevitable that the refractive index is as high as possible, and in the event that a lower limit of the conditional expression is surpassed, the curvature becomes excessive, whereby the spherical aberration and the comatic aberration become excessive, and the Petzval sum becomes too small, thereby making it impossible to obtain a good performance.

In addition, the 1b lens group is configured to include four lens elements in total, that is, a negative lens element, a positive lens element, a positive lens element and a positive lens element which has a meniscus shape which is convex on a contracting side thereof, and it is preferable that the following conditional expression (10) is satisfied with respect to the shape of a contracting-side surface of the lens element which is disposed fourth outermost from the magnifying side and the following conditional expression (11) is satisfied with respect to the dispersion properties of a glass material used for each lens element which makes up a cemented lens disposed on the magnifying side.

$$-1.5 \leq R_{Ib7}/f \leq -0.9 \quad (10)$$

$$10 \leq V_{IbP} - V_{IbN} \quad (11)$$

where, $R_{Ib7}$: Radius of curvature of the contracting-side surface of the lens element which is disposed fourth outermost from the magnifying side of the 1b lens group;

$V_{IbP}$: Mean value of Abbe numbers of the positive lens elements which make up the 1b lens group; and $V_{IbN}$: Mean value of Abbe numbers of the negative lens element which makes up the 1b lens group.

The conditional expression (10) is associated with the shape of the lens element which is disposed fourth outermost from the magnifying side of the 1b lens group, that is, the lens element which is disposed outermost on the contracting side, and the shape has a role of transmitting a bundle of dispersed rays from the 1a lens group to the rear while maintaining the generation of aberrations to a low level. In the event that an upper limit is surpassed, the correction of a large negative distortion produced by the 1b lens group becomes insufficient, whereas in the event that a lower limit is surpassed, although it is advantageous in correcting the distortion, the meniscus shape becomes too intensive, and high-order spherical aberration and comatic aberration are generated.

The conditional expression (11) is associated with the achromatism of the 1b lens group and specifies an appropriate combination of Abbe numbers in the glass material. Consequently, in a condition where a lower limit is surpassed, it becomes difficult to correct chromatic aberration.

In addition, the 2a lens group is configured to include two lens elements, that is, a positive lens element and a negative lens element or to include three lens elements in total, that is, a positive lens element, a negative lens element and a positive lens element, and it is preferable that the following conditional expressions (12) is satisfied with respect to a refractive index of a glass material used for each of the lens elements which make up the 2a lens group, the following conditional expression (13) is satisfied with respect to the dispersion properties of the positive lens elements which is disposed outermost on the magnifying side of the 2a lens group and the negative lens element which is disposed second outermost from the magnifying side of the 2a lens group, the following conditional expression (14) is satisfied with respect to a power set for the lens element which is disposed outermost on the magnifying side of the 2a lens group and the following conditional expression (15) is satisfied with respect to the shape of a contracting-side surface of the lens element which is disposed outermost on the magnifying side of the 2a lens group and the shape of a magnifying-side surface of the lens element which is disposed second outermost from the magnifying side of the 2a lens group.

$$0.1 \leq N_{IIaN} - N_{IIaP} \quad (12)$$

$$10 \leq V_{IIa1} - V_{IIa2} \quad (13)$$

$$0.2 \leq f/f_{IIa1} \leq 0.5 \quad (14)$$

$$0.8 \leq R_{IIa2}/R_{IIa3} \leq 1.5 \quad (15)$$

where, $N_{IIaN}$: Mean value of refractive indices of the negative lens element which makes up the 2a lens group relative to the d line;

$N_{IIaP}$: Mean value of refractive indices of the positive lens elements which make up the 2a lens group relative to the d line;

$V_{IIa1}$: Abbe number of the lens element which is disposed outermost on the magnifying side of the lens elements which make up the 2a lens group;

$V_{IIa2}$: Abbe number of the lens element which is disposed second outermost from the magnifying side of the lens elements which make up the 2a lens group;

$f_{IIa1}$: Focal length of the lens element which is disposed outermost on the magnifying side of the lens elements which make up the 2a lens group;

$R_{IIa2}$: Radius of curvature of a contracting-side surface of the lens element which is disposed outermost on the magnifying side of the lens elements which make up the 2a lens group; and $R_{IIa3}$: Radius of curvature of a magnifying-side surface of the lens element which is disposed second outermost from the magnifying side of the lens elements which make up the 2a lens group.

The conditional expression (12) specifies a condition for field curvature correction, which corrects a field curvature produced by the strong negative power of the 2a lens group. Namely, it is good to use a material having a high refractive index for the negative lens element and a material having a low refractive index for the positive lens element, so as to prevent the Petzval sum from becoming too small. In the event that a lower limit is surpassed, the Petzval sum becomes too small, whereby the field curvature is worsened.

The conditional expression (13) is a condition for correction of chromatic aberration of the 2a lens group. In the event that an upper limit is surpassed, the Abbe numbers come nearer to each other, and the chromatic aberration effect becomes insufficient.

The conditional expression (14) is, as with the conditional expression (13), a condition for correction of chromatic aberration of the 2a lens group. As is known, since chromatic aberration can be corrected by an appropriate combination of Abbe number and power, the conditional expression (14) specifies the power. In the event that an upper limit and a lower limit are surpassed, in both cases, the achromatic power of the 2a lens group becomes inappropriate, whereby the chromatic aberration are worsened.

The conditional expression (15) specifies a restricting condition regarding the shape of the 2a lens group and is associated with correction of spherical aberration and comatic aberration. In the event that an upper limit is surpassed, the spherical aberration becomes over, and the comatic aberration relative to a bundle of off-axis rays is also worsened. On the contrary, in the event that a lower limit is surpassed, the spherical aberration becomes under excessively.

In addition, the 2b lens group is configured to include three lens elements in total, that is, a positive lens element, a negative lens element, and a positive lens element, and it is preferable that the following conditional expressions (16), (17) are satisfied with respect to refractive index and dispersion properties of a glass material used for each of the lens elements which make up the 2b lens group, respectively, the following conditional expression (18) is satisfied with respect to a power set for the lens element which is disposed second outermost from the magnifying side of the 2b lens group, and the following conditional expression (19) is satisfied with respect to the shape of a magnifying-side surface and the shape of a contracting-side surface of the lens element which is disposed outermost on the magnifying side of the 2b lens group.

$$0.15 \leq N_{IIbN} - N_{IIbP} \quad (16)$$

$$20 \leq V_{IIbP} - V_{IIbN} \quad (17)$$

$$-0.75 \leq f/f_{IIb2} \leq -0.25 \quad (18)$$

$$-6.0 \leq R_{IIb1}/R_{IIb2} \leq -0.8 \quad (19)$$

where, $N_{IIbN}$: Mean value of refractive indices of the negative lens element which makes up the 2b lens group relative to the d line;

$N_{IIbP}$: Mean value of refractive indices of the positive lens elements which make up the 2b lens group relative to the d line;

$V_{IIbP}$: Mean value of Abbe numbers of the positive lens elements which make up the 2b lens group;

$V_{IIbN}$: Mean value of Abbe numbers of the negative lens element which makes up the 2b lens group;

$f_{IIb2}$: Focal length of the lens element which lies second outermost from the magnifying side of the lens elements which make up the 2b lens group;

$R_{IIb1}$: Radius of curvature of a magnifying-side surface of the lens element which is disposed outermost on the magnifying side of the 2b lens group; and $R_{IIb2}$: Radius of curvature of a contracting-side surface of the lens element which is disposed outermost on the magnifying side of the 2b lens group.

The conditional expression (16) is associated with the refractive index of a glass material for each of the lens elements which make up the 2b lens group which makes up the second lens group and has a large positive power. By giving a difference in refractive index between the positive and negative lens elements, a correcting capability of spherical aberration is made use of on a cemented surface while maintaining the generation of chromatic aberration to a minimum level, and the effect of field curvature correction is also expected. In the event that a lower limit is surpassed in the conditional expression (16), it results in overcorrection of field curvature and results in undercorrection of spherical aberration.

The conditional expression (17) specifies a condition for color correction in the 2b lens group, and in order to correct single-color aberrations at the same time, it is necessary that the powers of the respective lens elements do not become excessive, and to make this happen, it is a necessary condition that Abbe numbers of glass materials used for the positive lens elements and the negative lens element satisfy the conditional expression (17). In the event that a lower limit is surpassed, it becomes difficult to correct chromatic aberration.

The conditional expression (18) similarly specifies a condition for chromatic aberration correction or achromatism of the 2b lens group. In the event that both an upper limit and a lower limit are surpassed, in both cases, the achromatic power in the 2b lens group becomes inappropriate, and the chromatic aberration is worsened.

The conditional expression (19) specifies a restricting condition for the shape of the lens element which is disposed outermost on the magnifying side of the 2b lens group and is associated with spherical aberration and comatic aberration. In the event that an upper limit is surpassed, the spherical aberration becomes under largely, whereas in the event that a lower limit is surpassed, the generation of comatic flare in a bundle of marginal rays becomes remarkable.

In addition, as a method for adjusting the focal point of the whole lens system, a method for shifting the whole projection lens in the optical axis direction cannot be said to be a good method in a case where there is imposed a limitation on the size of a structure to be shifted. Then, in adopting a so-called inner focusing method in which the focal point is adjusted by shifting part of an optical system of a lens system, when taking it into consideration that the first lens group is substantially afocal, it is considered to make use of the lens group which is disposed closer to the contracting side than the first lens group, and it is preferable to adjust the focal point by shifting the second lens group in the optical axis direction because a spatial amount for shifting is sufficient and the change in aberrations due to distance can be suppressed to a least level.

Furthermore, in order to focus bundles of rays from the DMDs on to the surface of a screen with good efficiency, the angle of a principal ray of a bundle of rays emerging from the DMD must be set according to the properties of the illuminating optical system. Due to this, the lens system as being a projection lens is set substantially telecentric in many cases. However, when attempting to design such that all the rays are captured, the effective diameter of the second lens group on the contracting side thereof becomes gigantic, which in many cases causes a problem with the arrangement of the second lens group relative to the illuminating optical system. As this occurs, although there is imposed a limitation on the effective diameter in the vicinity of the emerging side of the second lens group depending upon the arrangement of the second lens group with the illuminating optical system, the objective is preferably attained by providing a third lens group which is made up of a single positive lens in the vicinity of the light valve in the airspace between the second lens group and the light valve.

Figure 17:
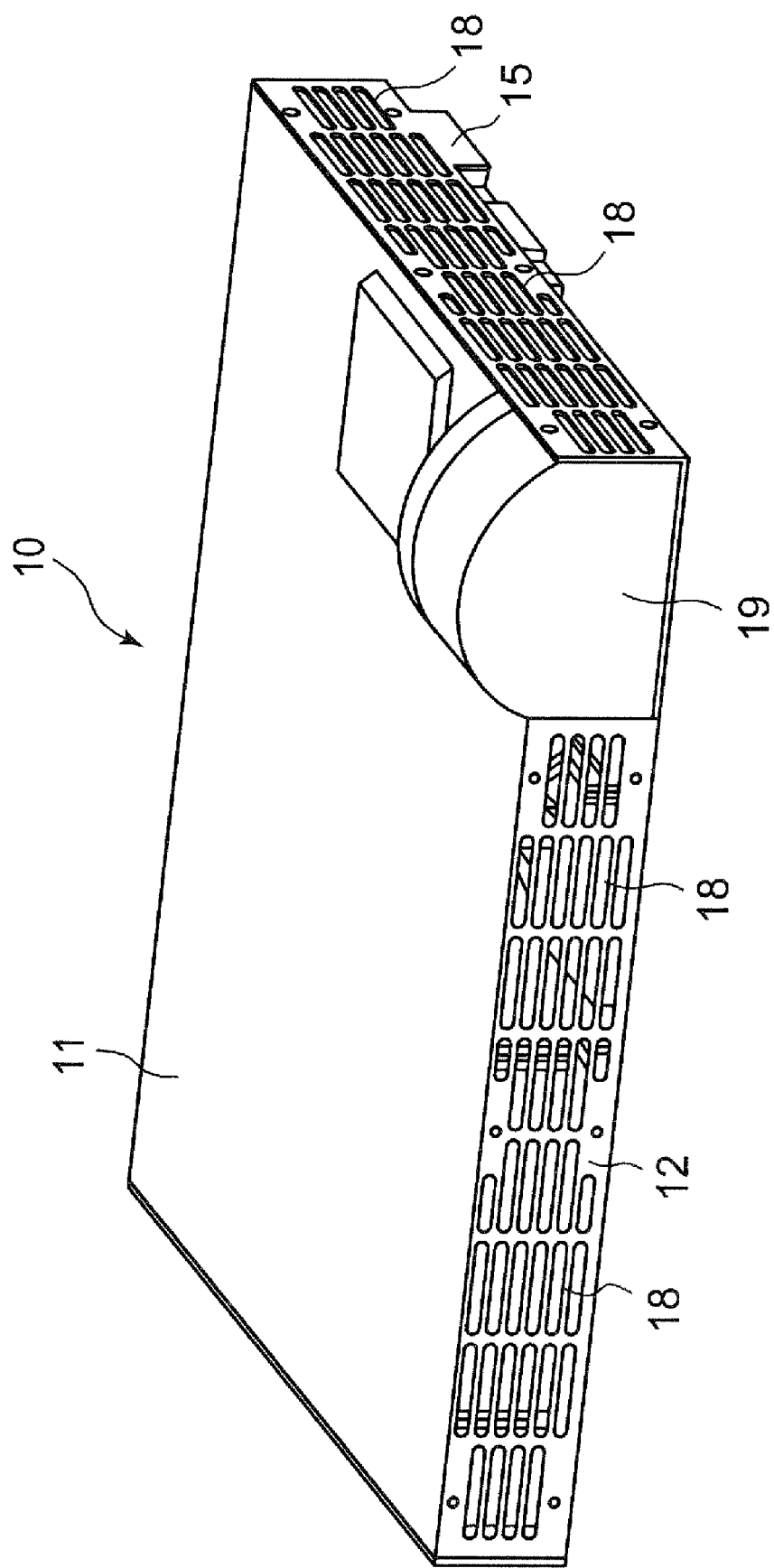
FIG. 17 is a drawing showing an external appearance of a projector which utilizes the lens system of the invention.

In addition, FIG. 17 shows an external appearance of a projector which utilizes the lens system of the invention. As is shown in FIG. 17, a projector 10 is formed substantially into a rectangular parallelepiped shape, and the projector 10 has a lens cover 19 which covers a projection opening provided at an end of a front plate 12 which makes up a main body housing, and a plurality of vent holes 18 are provided in the front plate 12. In addition, although the illustration thereof is omitted in FIG. 17, a key/indicator section is provided on an upper plate 11 which also makes up the main body housing, and this key/indicator section includes keys and indicators such as a power supply switch, a power indicator lamp which informs that the power supply is on or off, a lamp switch key for turning on a lamp of a light source unit, an indicator lamp which indicates that the lamp is turned on and an overheat indicator lamp which informs that the light source unit is under overheat when it actually happens. Furthermore, provided on a back plate, which is not shown, of the main body housing are an input/output connector section where USB terminals, D-SUB terminals for image signal input, S terminals, RCA terminals and the like are provided and an Ir receiving section where control signals from a power supply adapter plug and a remote controller are received. In addition, a plurality of vent holes 18 are provided in a right-hand side plate, not shown, which is a side plate of the main body housing, and a left-hand side plate 15, which is a side plate shown in FIG. 17, and a projection lens which adopts the lens system that has been described heretofore is installed inside the left-hand side plate 15 therealong.

Embodiment 1

Figure 2:
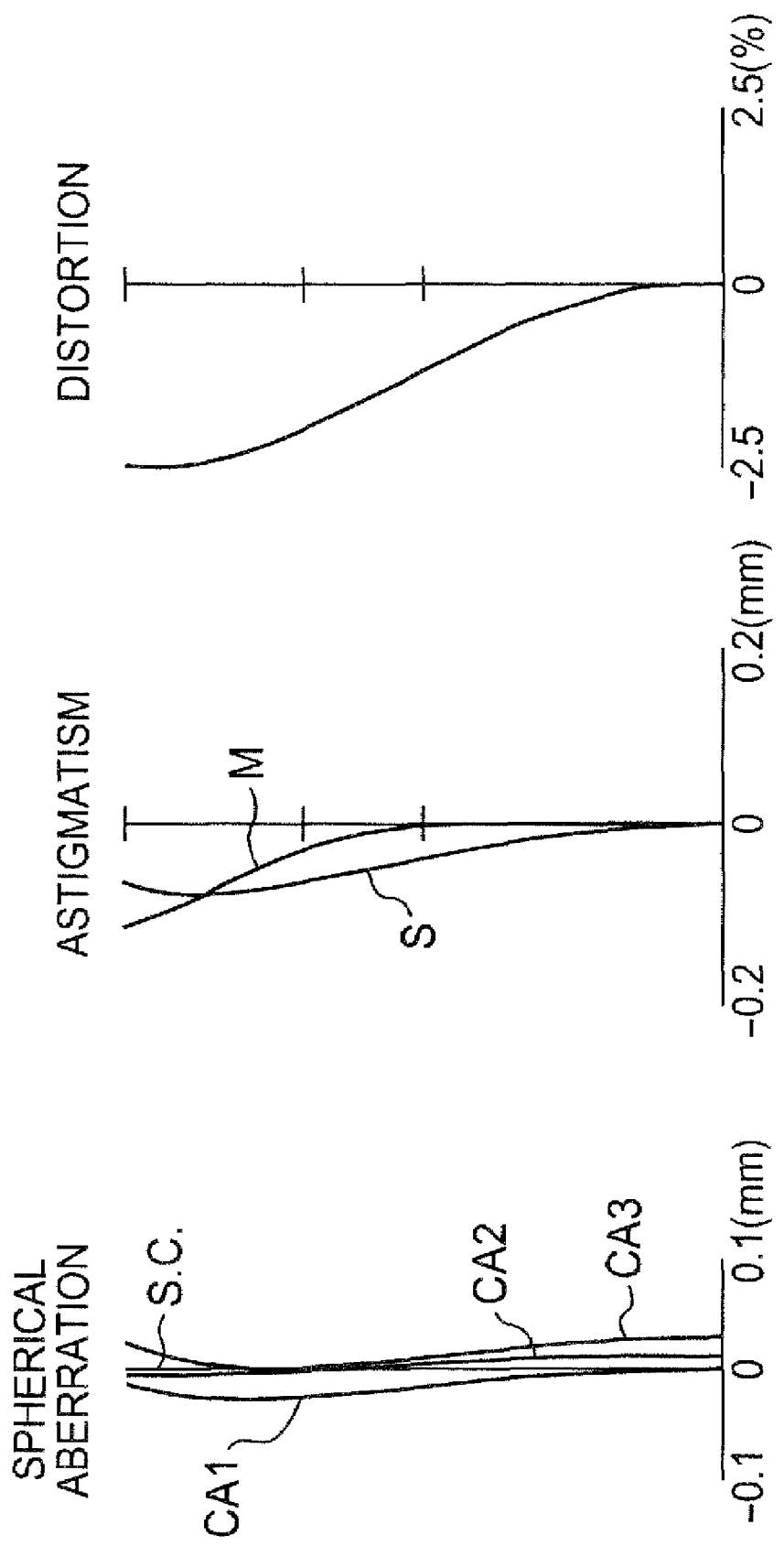
FIG. 2 is a drawing showing aberrations produced by the lens system according to the first embodiment.

A numerical example of a first embodiment of a lens system of the invention is shown in Table 1. In addition, FIG. 1 is a drawing showing the configuration of the lens system, and FIG. 2 is a drawing showing aberrations thereof. In the following tables and drawings, f denotes a focal length of the whole lens system, $F_{no}$ an F number, and $2\omega$ a total angle of view of the lens system. In addition, r denotes a radius of curvature, d a lens element thickness or spacing between lens elements, $n_d$ a refractive index relative to the d line, and $v_d$ Abbe number at the d line. In the drawings showing spherical aberration of the drawings showing the aberrations, CA1, CA2, CA3 denote aberration curves at wavelengths of CA1=550.0 nm, CA2=435.8 nm and CA3=640.0 nm, and S.C denotes a sine condition. In the drawing showing astigmatism, S denotes sagital, and M denotes meridional. In addition, throughout the tables, unless otherwise described, the wavelength used in calculation of numerical values is CA1=550.0 nm, and the drawings showing the aberrations show aberrations which result with an object distance of 1700 mm which is used in many cases for evaluation of a projection lens.

TABLE 1 f 16.01
$F_{no}$ 2.29
$2\omega$ 65.77

| Serial numbers | Surface numbers | r | d | $n_d$ | $v_d$ |
|---|---|---|---|---|---|
| 1 | 111 | 26.626 | 1.26 | 1.83400 | 37.34 |
| 2 | 112 | 14.328 | 5.49 | — | — |
| 3 | 113 | −3101.631 | 2.72 | 1.80518 | 25.46 |
| 4 | 114 | −39.554 | 0.10 | — | — |
| 5 | 115 | −151.432 | 1.20 | 1.77250 | 49.62 |
| 6 | 116 | 16.692 | 4.78 | — | — |
| 7 | 121 | −30.843 | 1.98 | 1.80518 | 25.46 |
| 8 | 122(123) | 25.148 | 6.90 | 1.62004 | 36.30 |
| 9 | 124 | −28.414 | 0.20 | — | — |
| 10 | 125 | 374.690 | 3.70 | 1.80518 | 25.46 |
| 11 | 126 | −41.814 | 3.31 | — | — |
| 12 | 127 | −19.502 | 3.45 | 1.49700 | 81.61 |
| 13 | 128 | −17.172 | 38.25 | — | — |
| 14 | 211 | −97.056 | 3.77 | 1.49700 | 81.61 |
| 15 | 212 | −20.546 | 2.34 | — | — |
| 16 | 213 | −17.176 | 1.42 | 1.77250 | 49.62 |
| 17 | 214 | −34.956 | 0.22 | — | — |
| 18 | 221 | 108.474 | 5.11 | 1.49700 | 81.61 |
| 19 | 222 | −25.737 | 0.20 | — | — |
| 20 | 223 | 36.340 | 1.20 | 1.83400 | 37.34 |
| 21 | 224(225) | 16.707 | 7.01 | 1.48749 | 70.45 |
| 22 | 226 | −499.119 | 34.00 | — | — |
| 23 | 301 | −100.000 | 3.00 | 1.77250 | 49.62 |
| 24 | 302 | −44.000 | 0.63 | — | — |
| 25 | C01 | ∞ | 3.00 | 1.48745 | 64.84 |
| 26 | C02 | ∞ | — | — | — |

Embodiment 2

Figure 3:
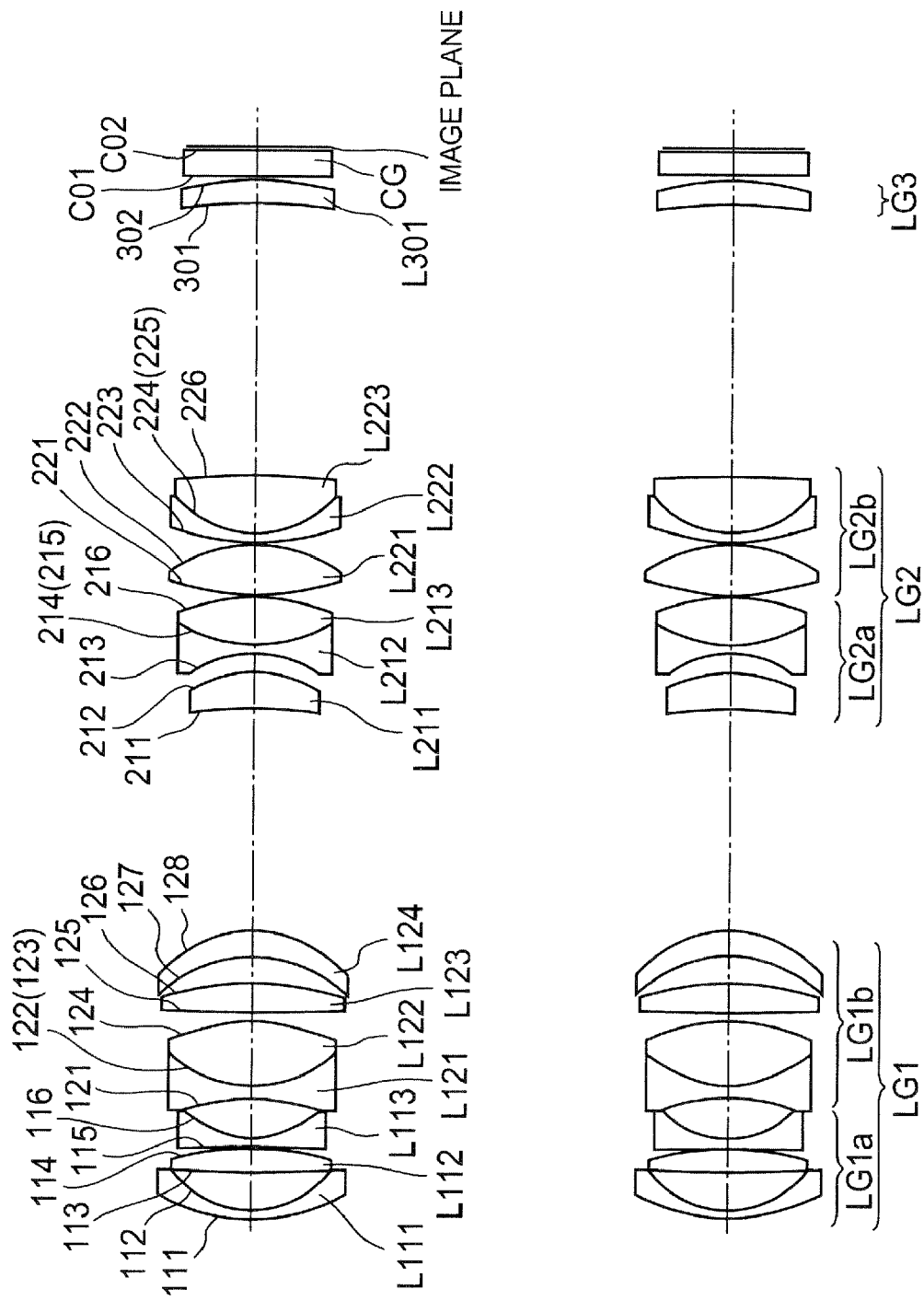
FIG. 3 is a drawing showing the configuration of lens elements of a lens system according to a second embodiment of the invention.
Figure 4:
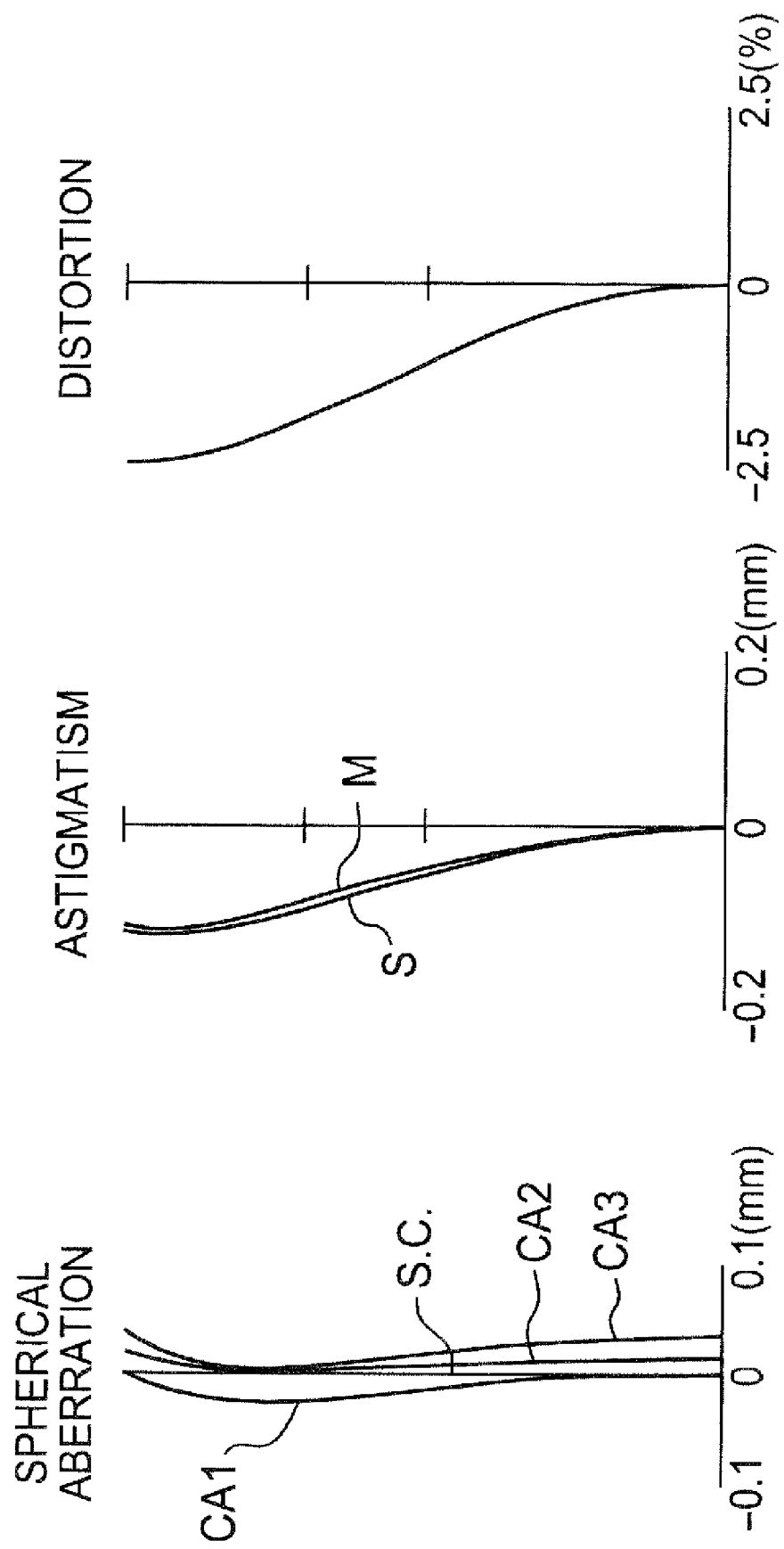
FIG. 4 is a drawing showing aberrations produced by the lens system according to the second embodiment.

A numerical example of a second embodiment of a lens system of the invention is shown in Table 2. In addition, FIG. 3 is a drawing showing the configuration of the lens system, and FIG. 4 is a drawing showing aberrations thereof.

TABLE 2 f 15.95
$F_{no}$ 2.29
$2\omega$ 65.96

| Serial numbers | Surface numbers | r | d | $n_d$ | $v_d$ |
|---|---|---|---|---|---|
| 1 | 111 | 29.623 | 1.20 | 1.83400 | 37.34 |
| 2 | 112 | 15.130 | 4.79 | — | — |
| 3 | 113 | 169.840 | 2.77 | 1.80518 | 25.46 |
| 4 | 114 | −50.405 | 0.20 | — | — |
| 5 | 115 | −3436.423 | 1.20 | 1.80420 | 46.50 |
| 6 | 116 | 14.444 | 5.13 | — | — |
| 7 | 121 | −27.012 | 1.40 | 1.80518 | 25.46 |
| 8 | 122(123) | 17.852 | 7.98 | 1.74950 | 35.04 |

TABLE 2-continued

| | | f 15.95 | | | |
| | | $F_{no}$ 2.29 | | | |
| | | 2ω 65.96 | | | |

| Serial numbers | Surface numbers | r | d | $n_d$ | $v_d$ |
|---|---|---|---|---|---|
| 9 | 124 | −31.098 | 1.06 | — | — |
| 10 | 125 | 268.532 | 3.94 | 1.80518 | 25.46 |
| 11 | 126 | −39.794 | 3.03 | — | — |
| 12 | 127 | −21.097 | 3.41 | 1.49700 | 81.61 |
| 13 | 128 | −17.958 | 28.17 | — | — |
| 14 | 211 | −92.353 | 4.59 | 1.51680 | 64.20 |
| 15 | 212 | −21.593 | 2.54 | — | — |
| 16 | 213 | −16.555 | 1.01 | 1.80610 | 40.73 |
| 17 | 214(215) | 22.631 | 6.10 | 1.60342 | 38.00 |
| 18 | 216 | −29.459 | 0.20 | — | — |
| 19 | 221 | 43.811 | 6.41 | 1.49700 | 81.61 |
| 20 | 222 | −23.607 | 0.21 | — | — |
| 21 | 223 | 42.444 | 1.20 | 1.83400 | 37.34 |
| 22 | 224(225) | 16.494 | 7.29 | 1.48749 | 70.45 |
| 23 | 226 | −145.343 | 34.00 | — | — |
| 24 | 301 | −100.000 | 3.00 | 1.77250 | 49.62 |
| 25 | 302 | −44.000 | 0.63 | — | — |
| 26 | C01 | ∞ | 3.00 | 1.48745 | 64.84 |
| 27 | C02 | ∞ | — | — | — |

Embodiment 3

Figure 5:
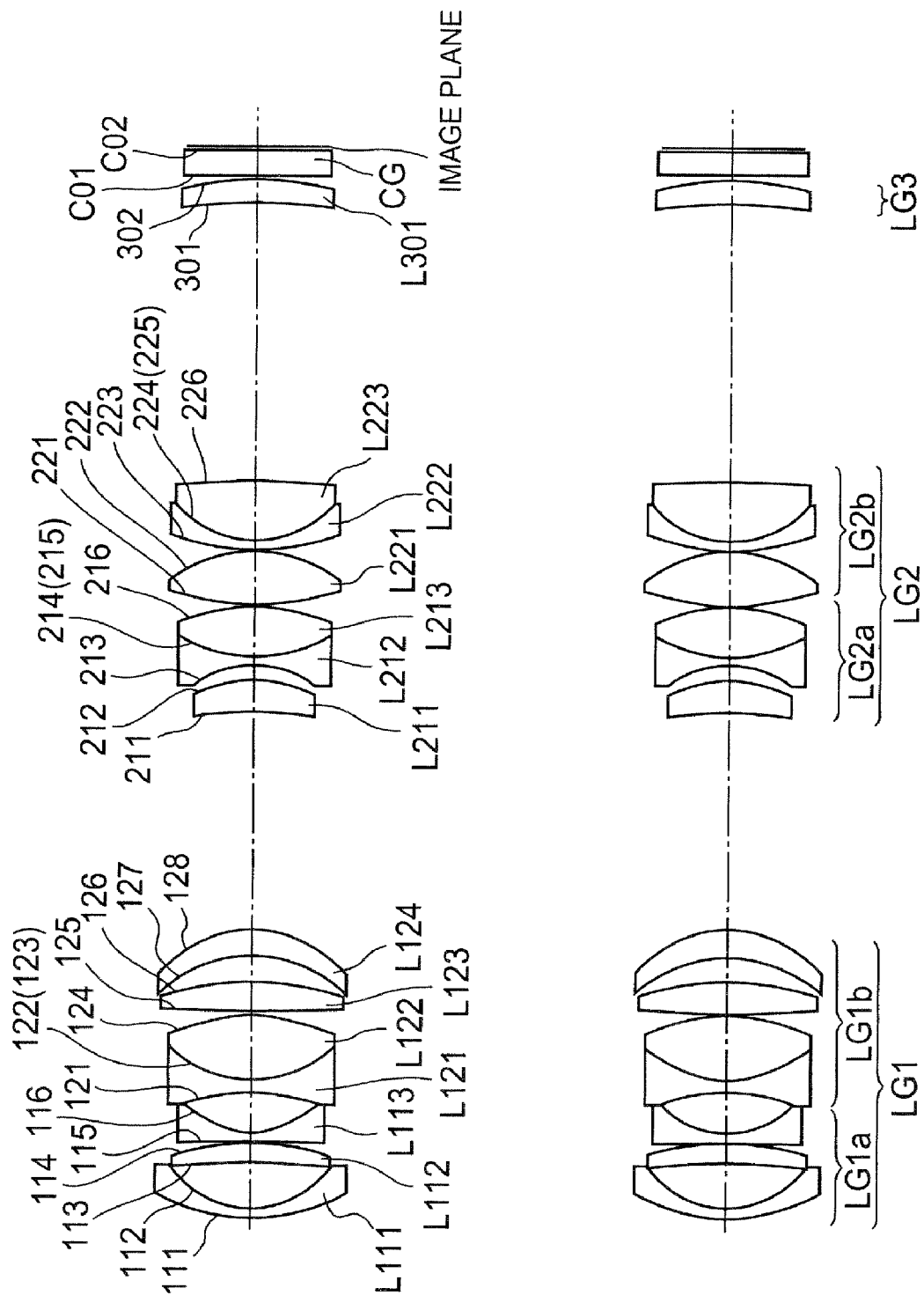
FIG. 5 is a drawing showing the configuration of lens elements of a lens system according to a third embodiment of the invention.
Figure 6:
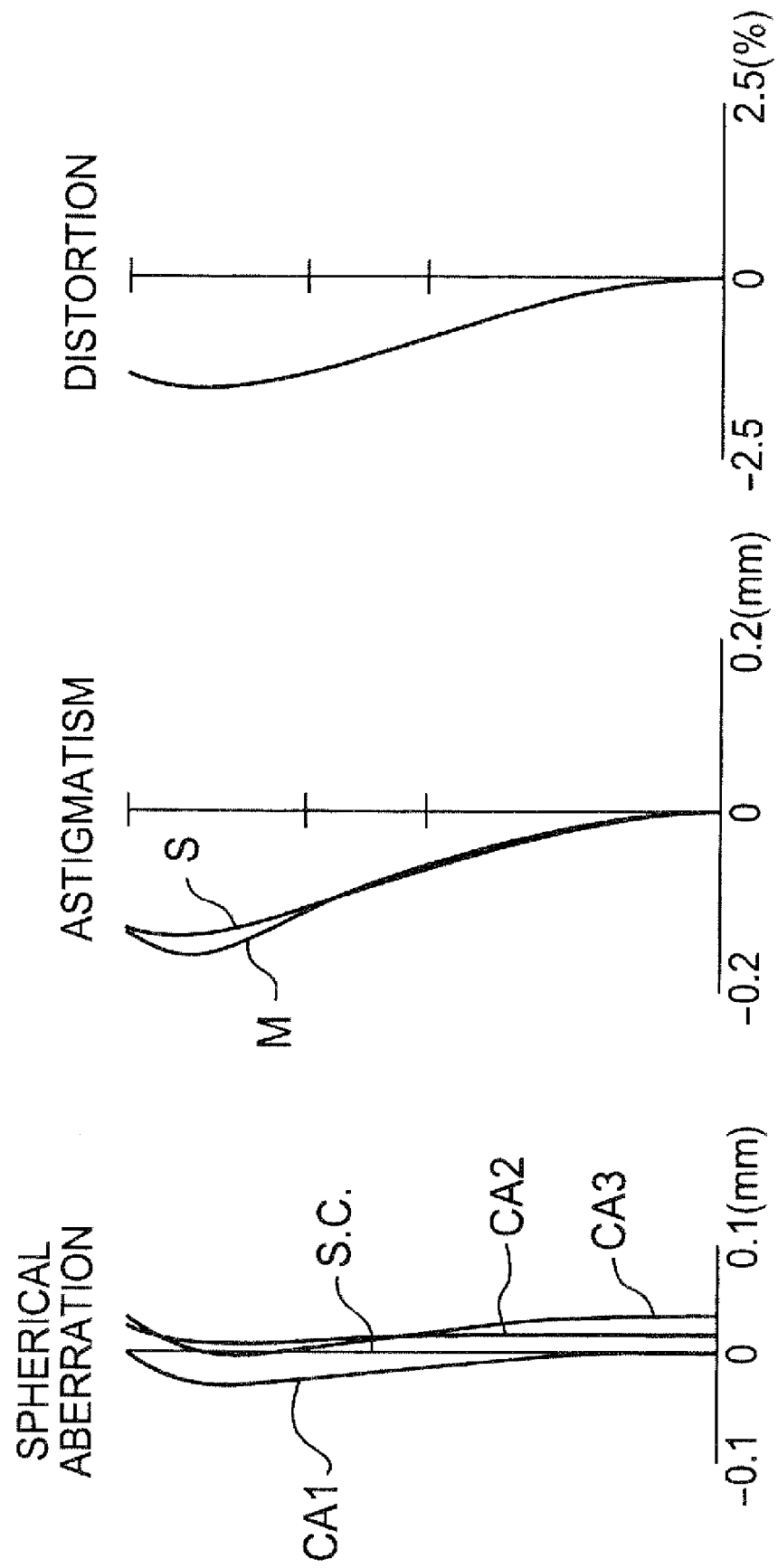
FIG. 6 is a drawing showing aberrations produced by the lens system according to the third embodiment.

A numerical example of a third embodiment of a lens system of the invention is shown in Table 3. In addition, FIG. 5 is a drawing showing the configuration of the lens system, and FIG. 6 is a drawing showing aberrations thereof.

TABLE 3

| | | f 15.98 | | | |
| | | $F_{no}$ 2.29 | | | |
| | | 2ω 65.25 | | | |

| Serial numbers | Surface numbers | r | d | $n_d$ | $v_d$ |
|---|---|---|---|---|---|
| 1 | 111 | 32.325 | 1.20 | 1.83400 | 37.34 |
| 2 | 112 | 15.076 | 5.50 | — | — |
| 3 | 113 | −169.279 | 2.47 | 1.80518 | 25.46 |
| 4 | 114 | −38.056 | 0.20 | — | — |
| 5 | 115 | 231394.363 | 1.20 | 1.77250 | 49.62 |
| 6 | 116 | 15.501 | 4.83 | — | — |
| 7 | 121 | −33.059 | 1.40 | 1.80518 | 25.46 |
| 8 | 122(123) | 18.494 | 7.75 | 1.74950 | 35.04 |
| 9 | 124 | −32.396 | 0.60 | — | — |
| 10 | 125 | 185.517 | 3.87 | 1.80518 | 25.46 |
| 11 | 126 | −43.625 | 2.88 | — | — |
| 12 | 127 | −22.063 | 3.63 | 1.48749 | 70.45 |
| 13 | 128 | −17.956 | 26.98 | — | — |
| 14 | 211 | −49.144 | 4.00 | 1.51680 | 64.20 |
| 15 | 212 | −18.736 | 1.83 | — | — |
| 16 | 213 | −15.306 | 1.00 | 1.80610 | 40.73 |
| 17 | 214(215) | 21.679 | 6.29 | 1.60342 | 38.00 |
| 18 | 216 | −27.234 | 0.20 | — | — |
| 19 | 221 | 43.767 | 6.57 | 1.49700 | 81.61 |
| 20 | 222 | −22.619 | 0.20 | — | — |
| 21 | 223 | 40.180 | 1.20 | 1.83400 | 37.34 |
| 22 | 224(225) | 15.932 | 7.47 | 1.48749 | 70.45 |
| 23 | 226 | −137.785 | 34.00 | — | — |
| 24 | 301 | −100.000 | 3.00 | 1.77250 | 49.62 |
| 25 | 302 | −44.000 | 0.63 | — | — |
| 26 | C01 | ∞ | 3.00 | 1.48745 | 64.84 |
| 27 | C02 | ∞ | — | — | — |

Embodiment 4

Figure 7:
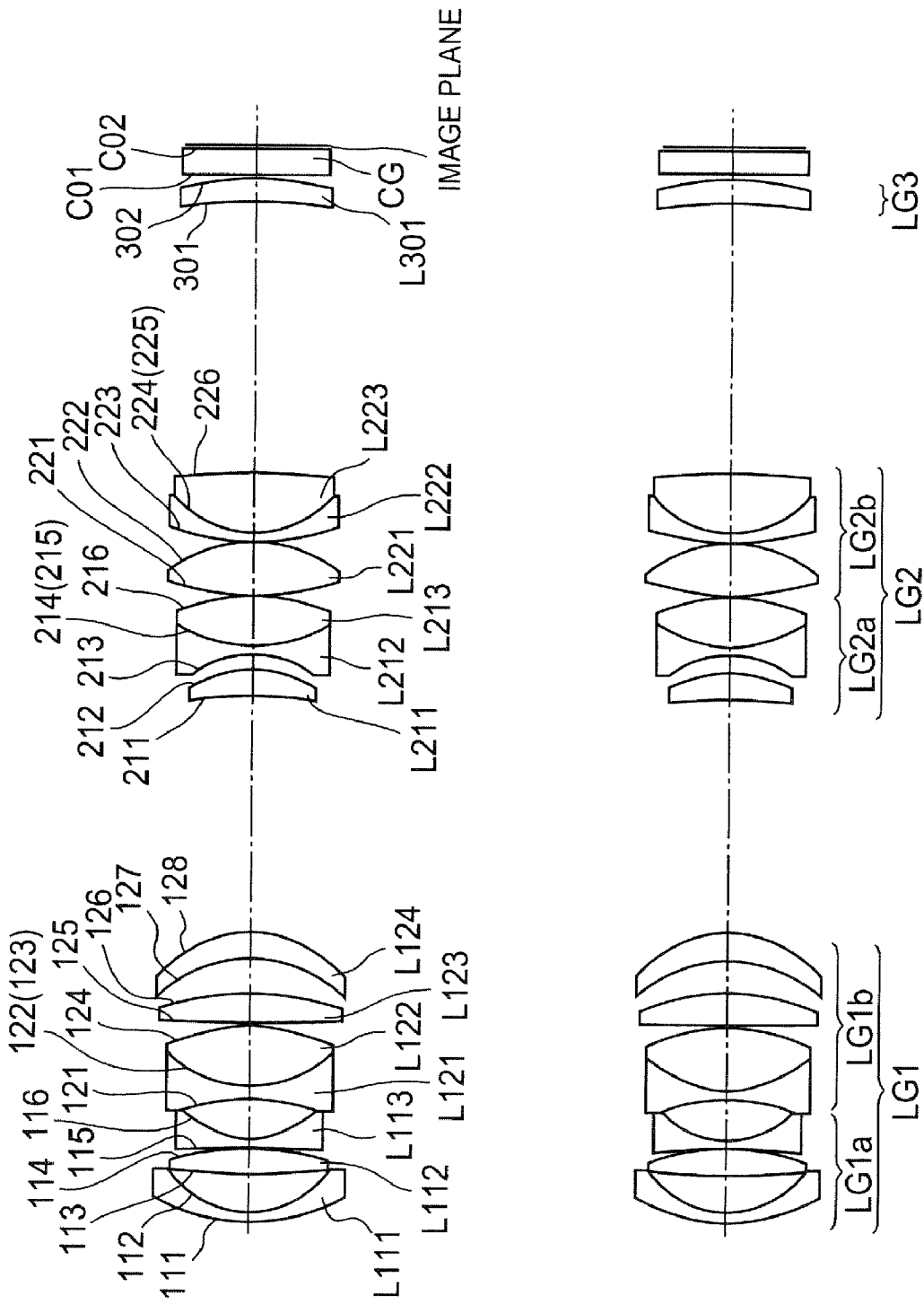
FIG. 7 is a drawing showing the configuration of lens elements of a lens system according to a fourth embodiment of the invention.
Figure 8:
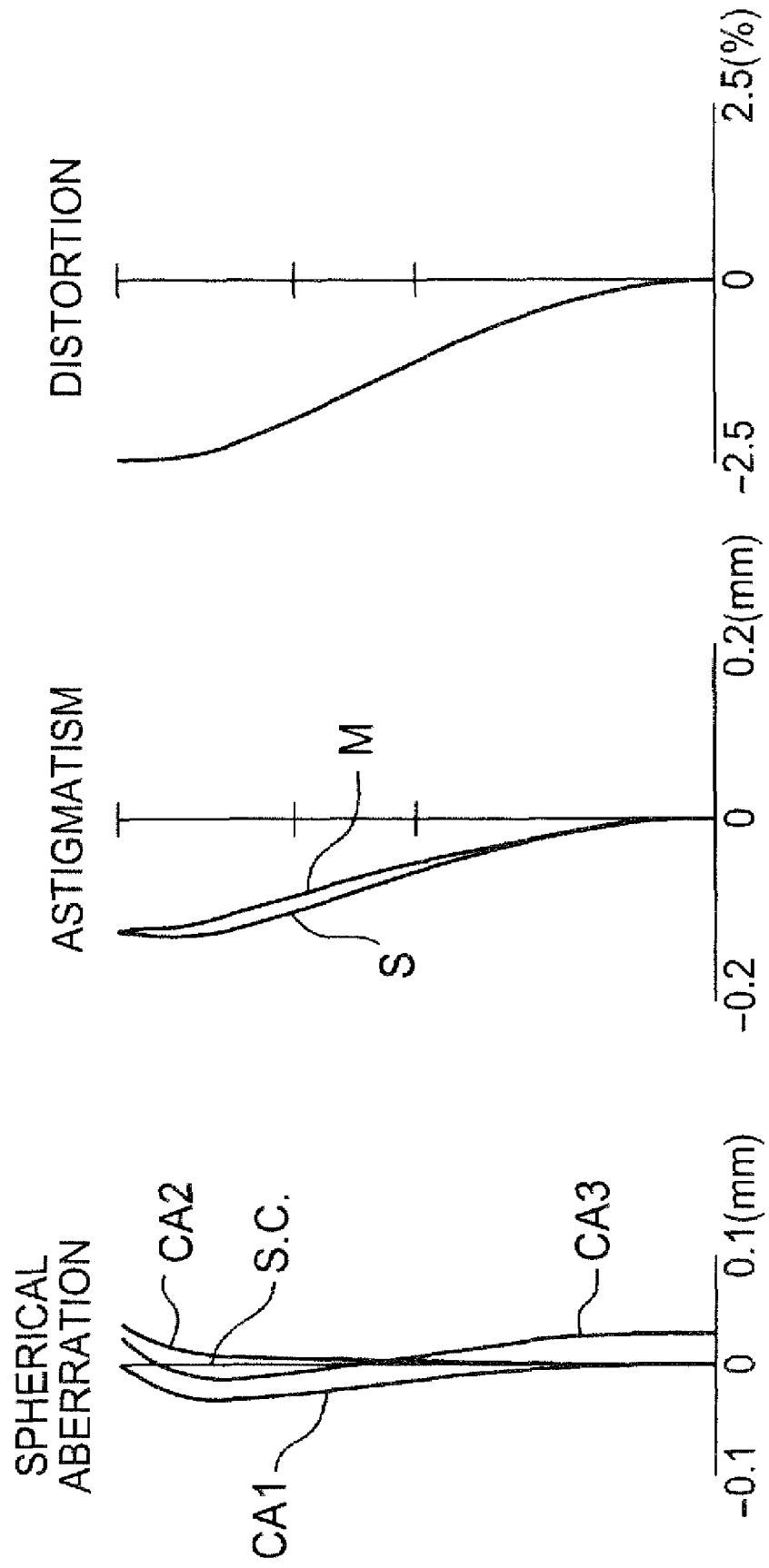
FIG. 8 is a drawing showing aberrations produced by the lens system according to the fourth embodiment.

A numerical example of a forth embodiment of a lens system of the invention is shown in Table 4. In addition, FIG. 7 is a drawing showing the configuration of the lens system, and FIG. 8 is a drawing showing aberrations thereof.

TABLE 4

| | | f 15.95 | | | |
| | | $F_{no}$ 2.29 | | | |
| | | 2ω 65.97 | | | |

| Serial numbers | Surface numbers | r | d | $n_d$ | $v_d$ |
|---|---|---|---|---|---|
| 1 | 111 | 31.347 | 1.20 | 1.83400 | 37.34 |
| 2 | 112 | 15.210 | 4.78 | — | — |
| 3 | 113 | 191.532 | 3.01 | 1.80518 | 25.46 |
| 4 | 114 | −41.224 | 0.20 | — | — |
| 5 | 115 | −95.223 | 1.20 | 1.77250 | 49.62 |
| 6 | 116 | 14.940 | 4.85 | — | — |
| 7 | 121 | −32.233 | 1.40 | 1.80518 | 25.46 |
| 8 | 122(123) | 19.101 | 7.67 | 1.72342 | 37.99 |
| 9 | 124 | −33.224 | 0.36 | — | — |
| 10 | 125 | 599.879 | 3.94 | 1.80518 | 25.46 |
| 11 | 126 | −36.665 | 4.33 | — | — |
| 12 | 127 | −20.869 | 3.60 | 1.51680 | 64.20 |
| 13 | 128 | −17.536 | 29.28 | — | — |
| 14 | 211 | −211.059 | 3.37 | 1.51680 | 64.20 |
| 15 | 212 | −20.603 | 2.28 | — | — |
| 16 | 213 | −16.124 | 1.00 | 1.80610 | 40.73 |
| 17 | 214(215) | 21.068 | 6.22 | 1.59551 | 39.23 |
| 18 | 216 | −30.035 | 0.20 | — | — |
| 19 | 221 | 42.487 | 6.64 | 1.49700 | 81.61 |
| 20 | 222 | −22.539 | 0.20 | — | — |
| 21 | 223 | 49.857 | 1.20 | 1.80610 | 40.73 |
| 22 | 224(225) | 15.643 | 7.32 | 1.51680 | 64.20 |
| 23 | 226 | −223.858 | 34.00 | — | — |
| 24 | 301 | −100.000 | 3.00 | 1.77250 | 49.62 |
| 25 | 302 | −44.000 | 0.63 | — | — |
| 26 | C01 | ∞ | 3.00 | 1.48745 | 64.84 |
| 27 | C02 | ∞ | — | — | — |

Embodiment 5

Figure 9:
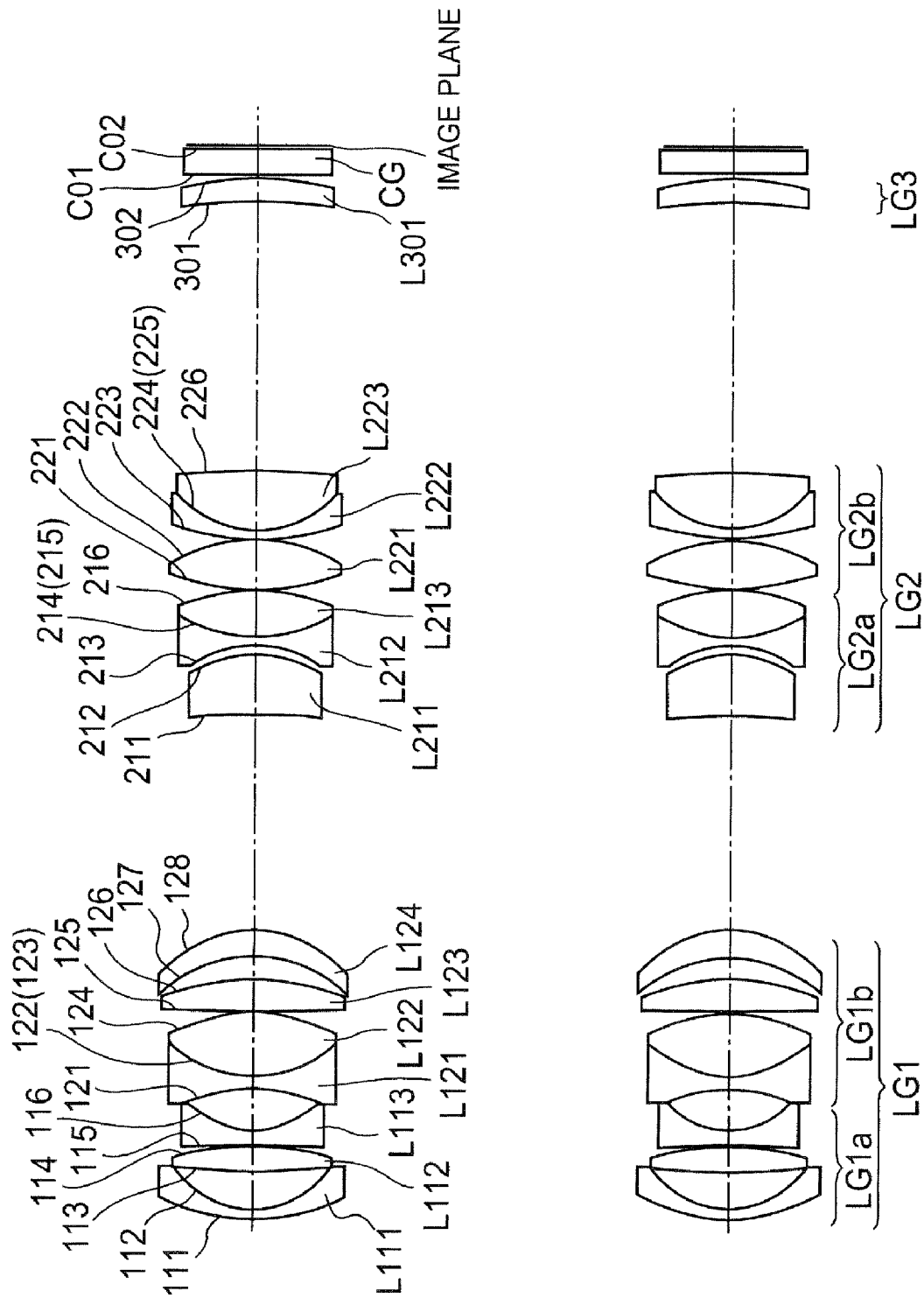
FIG. 9 is a drawing showing the configuration of lens elements of a lens system according to a fifth embodiment of the invention.
Figure 10:
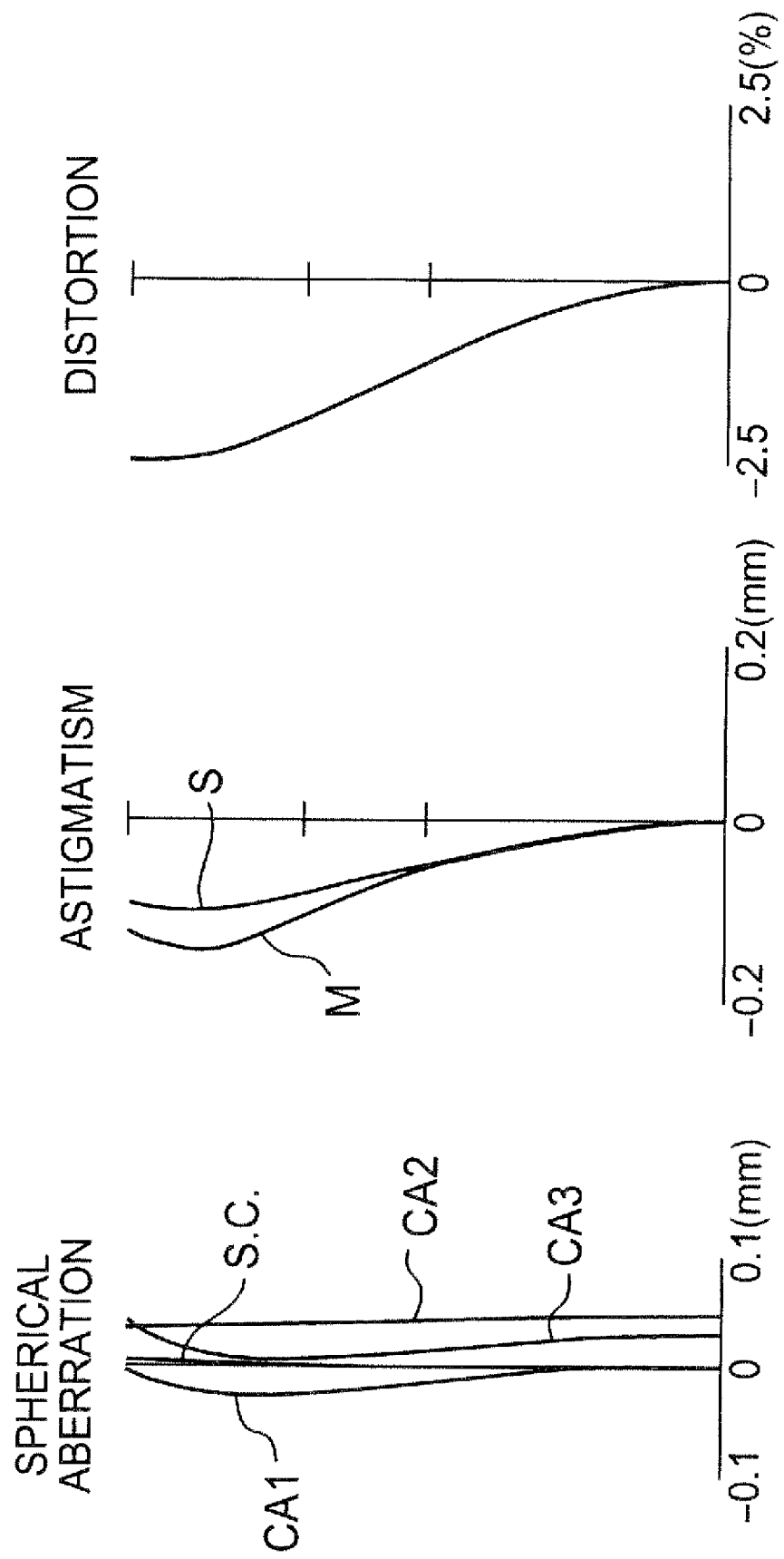
FIG. 10 is a drawing showing aberrations produced by the lens system according to the fifth embodiment.

A numerical example of a fifth embodiment of a lens system of the invention is shown in Table 5. In addition, FIG. 9 is a drawing showing the configuration of the lens system, and FIG. 10 is a drawing showing aberrations thereof.

TABLE 5

| | | f 15.97 | | | |
| | | $F_{no}$ 2.29 | | | |
| | | 2ω 65.91 | | | |

| Serial numbers | Surface numbers | r | d | $n_d$ | $v_d$ |
|---|---|---|---|---|---|
| 1 | 111 | 32.106 | 1.50 | 1.83400 | 37.34 |
| 2 | 112 | 14.894 | 4.44 | — | — |
| 3 | 113 | 95.965 | 3.05 | 1.80518 | 25.46 |
| 4 | 114 | −48.411 | 0.20 | — | — |
| 5 | 115 | −1996.799 | 2.01 | 1.77250 | 49.62 |
| 6 | 116 | 13.641 | 5.39 | — | — |
| 7 | 121 | −21.536 | 1.40 | 1.80518 | 25.46 |
| 8 | 122(123) | 18.684 | 8.09 | 1.72342 | 37.99 |
| 9 | 124 | −26.697 | 0.20 | — | — |
| 10 | 125 | 251.873 | 4.06 | 1.80518 | 25.46 |
| 11 | 126 | −37.708 | 2.92 | — | — |
| 12 | 127 | −20.561 | 3.50 | 1.48749 | 70.45 |
| 13 | 128 | −17.522 | 27.15 | — | — |
| 14 | 211 | −172.734 | 7.81 | 1.48749 | 70.45 |
| 15 | 212 | −19.778 | 1.09 | — | — |

TABLE 5-continued f 15.97
$F_{no}$ 2.29
$2\omega$ 65.91

| Serial numbers | Surface numbers | r | d | $n_d$ | $v_d$ |
|---|---|---|---|---|---|
| 16 | 213 | −17.414 | 1.00 | 1.80610 | 40.73 |
| 17 | 214(215) | 23.080 | 6.02 | 1.60342 | 38.00 |
| 18 | 216 | −32.704 | 0.20 | — | — |
| 19 | 221 | 39.122 | 6.31 | 1.48749 | 70.45 |
| 20 | 222 | −25.803 | 0.20 | — | — |
| 21 | 223 | 43.911 | 1.20 | 1.83400 | 37.34 |
| 22 | 224(225) | 16.217 | 7.23 | 1.48749 | 70.45 |
| 23 | 226 | −169.264 | 34.00 | — | — |
| 24 | 301 | −100.000 | 3.00 | 1.77250 | 49.62 |
| 25 | 302 | −44.000 | 0.63 | — | — |
| 26 | C01 | ∞ | 3.00 | 1.48745 | 64.84 |
| 27 | C02 | ∞ | — | — | — |

Embodiment 6

Figure 11:
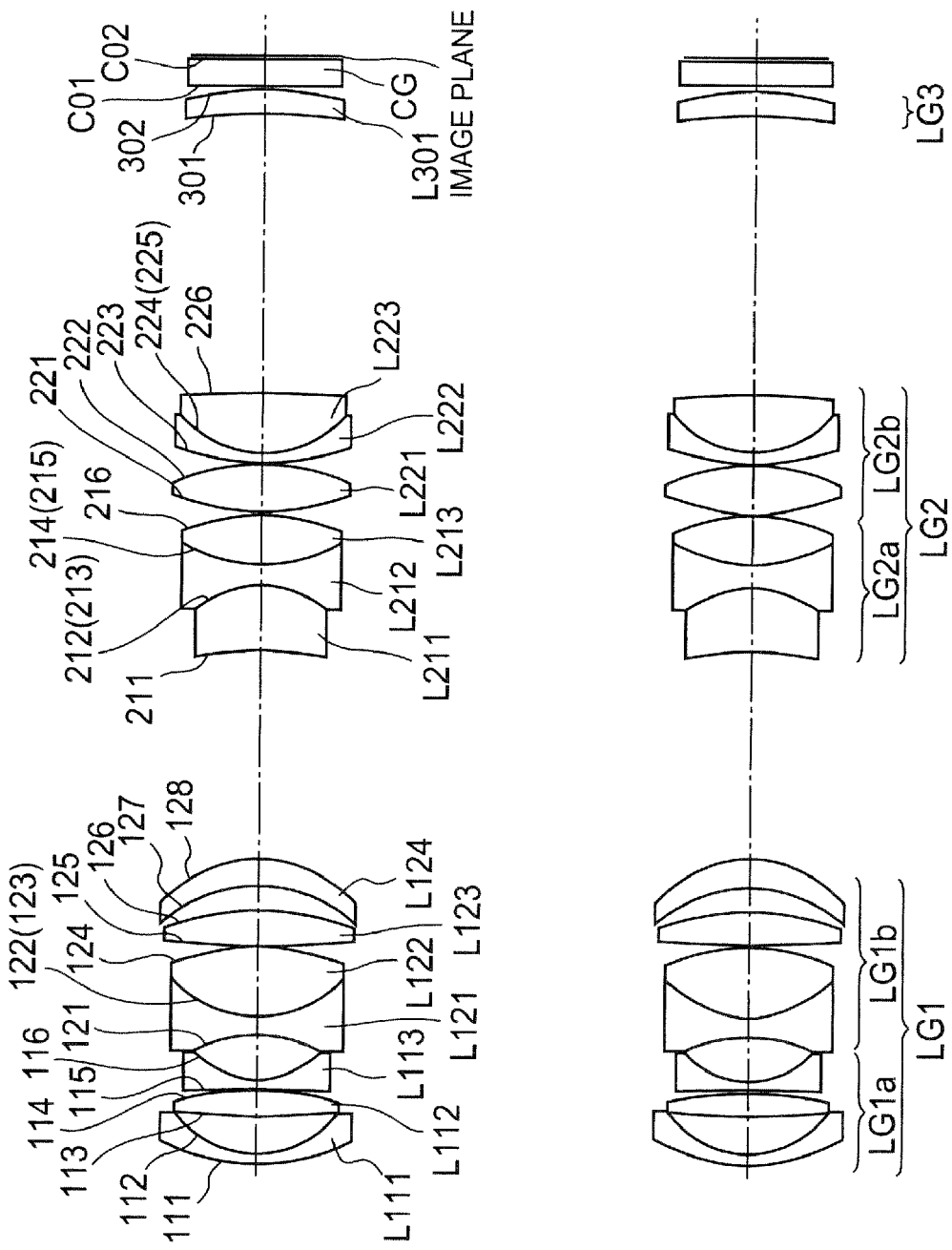
FIG. 11 is a drawing showing the configuration of lens elements of a lens system according to a sixth embodiment of the invention.
Figure 12:
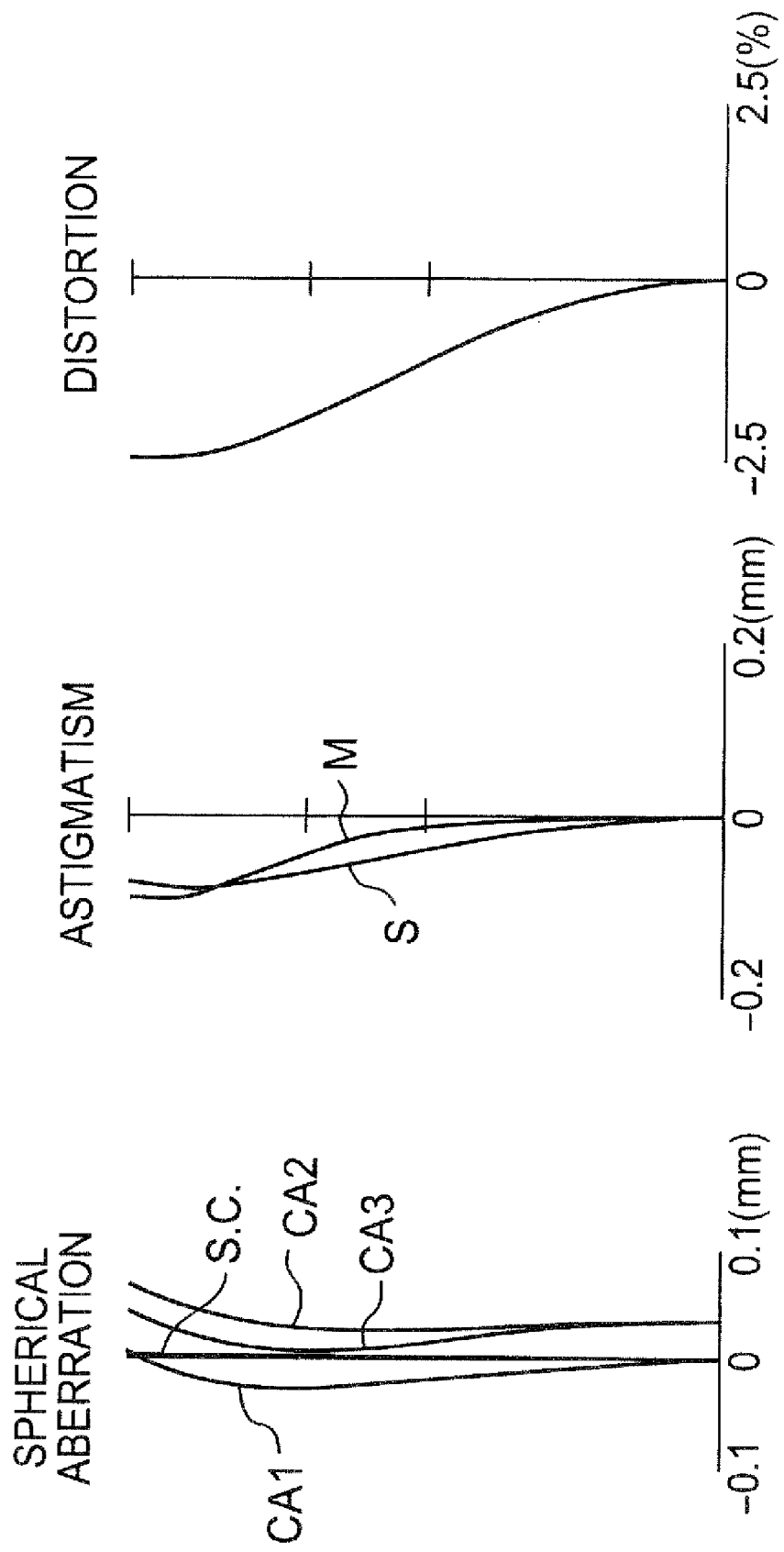
FIG. 12 is a drawing showing aberrations produced by the lens system according to the sixth embodiment.

A numerical example of a sixth embodiment of a lens system of the invention is shown in Table 6. In addition, FIG. 11 is a drawing showing the configuration of the lens system, and FIG. 12 is a drawing showing aberrations thereof.

TABLE 6 f 15.97
$F_{no}$ 2.29
$2\omega$ 65.89

| Serial numbers | Surface numbers | r | d | $n_d$ | $v_d$ |
|---|---|---|---|---|---|
| 1 | 111 | 32.232 | 1.20 | 1.83400 | 37.34 |
| 2 | 112 | 15.426 | 4.38 | — | — |
| 3 | 113 | 97.820 | 2.96 | 1.80518 | 25.46 |
| 4 | 114 | −54.070 | 0.20 | — | — |
| 5 | 115 | 229.321 | 1.24 | 1.77250 | 49.62 |
| 6 | 116 | 13.450 | 5.24 | — | — |
| 7 | 121 | −24.982 | 2.46 | 1.80518 | 25.46 |
| 8 | 122(123) | 17.389 | 8.50 | 1.72342 | 37.99 |
| 9 | 124 | −32.334 | 0.20 | — | — |
| 10 | 125 | 140.172 | 4.23 | 1.80518 | 25.46 |
| 11 | 126 | −39.457 | 2.90 | — | — |
| 12 | 127 | −21.673 | 3.46 | 1.48749 | 70.45 |
| 13 | 128 | −18.133 | 25.41 | — | — |
| 14 | 211 | −52.526 | 7.96 | 1.48749 | 70.45 |
| 15 | 212(213) | −15.651 | 2.59 | 1.80420 | 46.50 |
| 16 | 214(215) | 25.512 | 6.15 | 1.62374 | 47.05 |
| 17 | 216 | −28.648 | 0.20 | — | — |
| 18 | 221 | 34.154 | 5.96 | 1.48749 | 70.45 |
| 19 | 222 | −32.542 | 0.20 | — | — |
| 20 | 223 | 41.205 | 1.20 | 1.83400 | 37.34 |
| 21 | 224(225) | 15.797 | 7.17 | 1.48749 | 70.45 |
| 22 | 226 | −320.015 | 34.00 | — | — |
| 23 | 301 | −100.000 | 3.00 | 1.77250 | 49.62 |
| 24 | 302 | −44.000 | 0.63 | — | — |
| 25 | C01 | ∞ | 3.00 | 1.48745 | 64.84 |
| 26 | C02 | ∞ | — | — | — |

Embodiment 7

Figure 13:
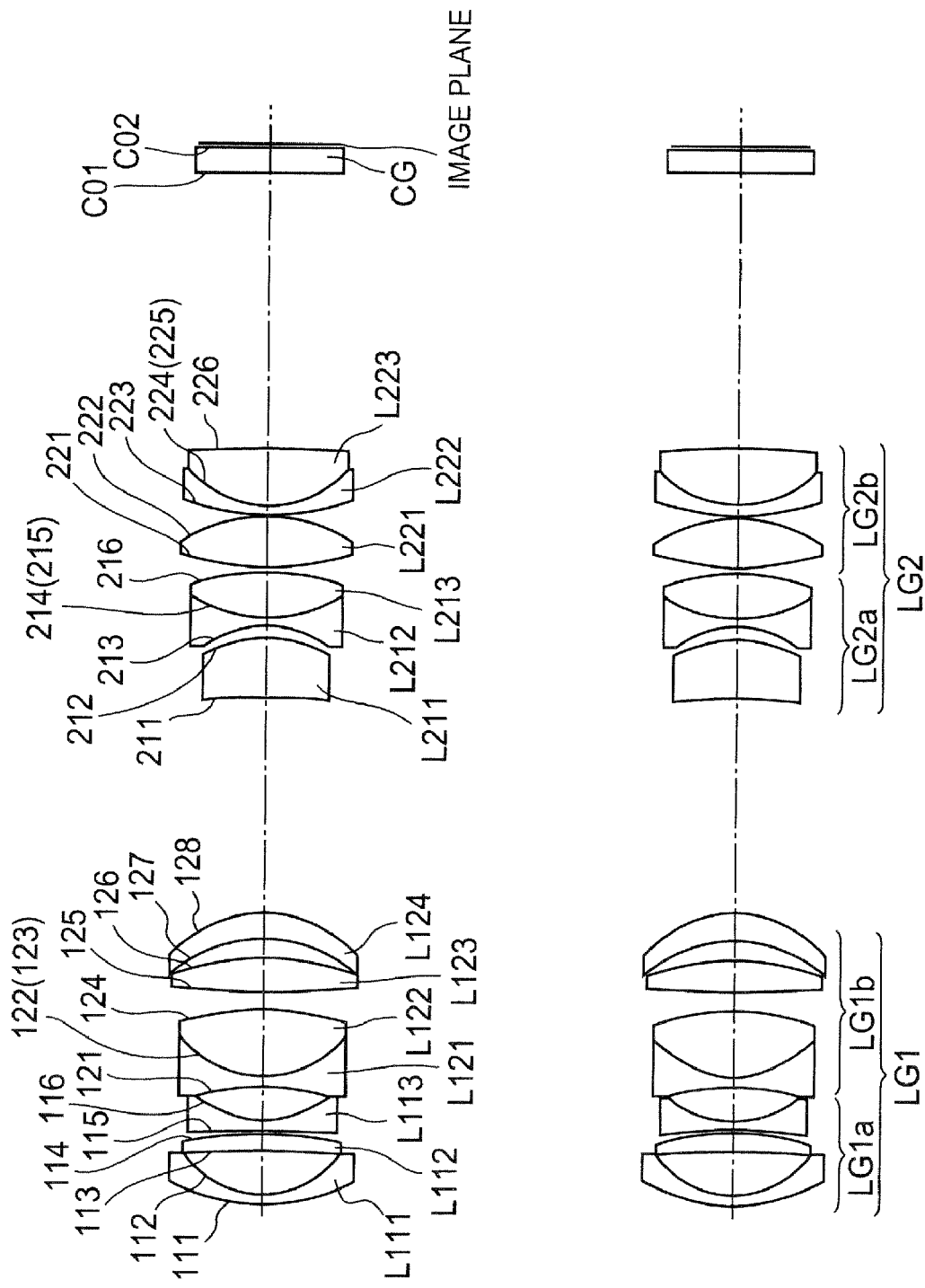
FIG. 13 is a drawing showing the configuration of lens elements of a lens system according to a seventh embodiment of the invention.
Figure 14:
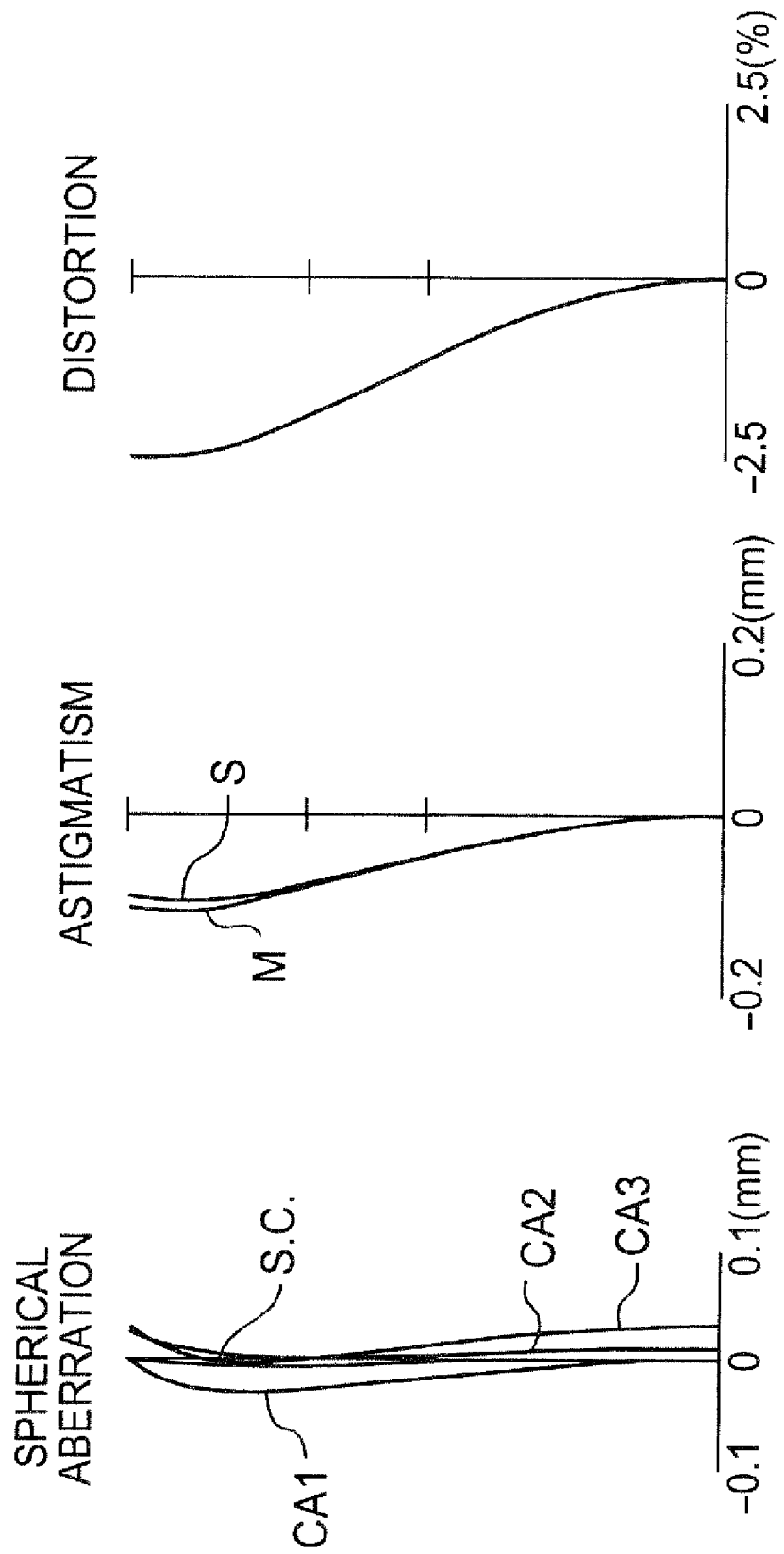
FIG. 14 is a drawing showing aberrations produced by the lens system according to the seventh embodiment.

A numerical example of a seventh embodiment of a lens system of the invention is shown in Table 7. In addition, FIG. 13 is a drawing showing the configuration of the lens system, and FIG. 14 is a drawing showing aberrations thereof.

TABLE 7 f 15.94
$F_{no}$ 2.29
$2\omega$ 65.99

| Serial numbers | Surface numbers | r | d | $n_d$ | $v_d$ |
|---|---|---|---|---|---|
| 1 | 111 | 29.379 | 1.20 | 1.80100 | 34.97 |
| 2 | 112 | 14.845 | 5.52 | — | — |
| 3 | 113 | −225.975 | 2.44 | 1.80518 | 25.46 |
| 4 | 114 | −40.518 | 0.20 | — | — |
| 5 | 115 | −117.999 | 1.20 | 1.80420 | 46.49 |
| 6 | 116 | 17.476 | 4.12 | — | — |
| 7 | 121 | −48.537 | 1.40 | 1.78472 | 25.72 |
| 8 | 122(123) | 16.648 | 8.30 | 1.72047 | 34.71 |
| 9 | 124 | −41.938 | 2.37 | — | — |
| 10 | 125 | 252.668 | 4.09 | 1.76182 | 26.61 |
| 11 | 126 | −38.078 | 2.59 | — | — |
| 12 | 127 | −22.121 | 3.33 | 1.48749 | 70.45 |
| 13 | 128 | −18.625 | 27.28 | — | — |
| 14 | 211 | −204.975 | 7.66 | 1.51680 | 64.20 |
| 15 | 212 | −20.634 | 1.59 | — | — |
| 16 | 213 | −17.025 | 1.00 | 1.80610 | 40.73 |
| 17 | 214(215) | 21.797 | 5.77 | 1.60342 | 38.00 |
| 18 | 216 | −36.775 | 0.75 | — | — |
| 19 | 221 | 43.917 | 6.36 | 1.49700 | 81.61 |
| 20 | 222 | −23.890 | 0.20 | — | — |
| 21 | 223 | 39.854 | 1.20 | 1.83400 | 37.34 |
| 22 | 224(225) | 16.602 | 7.30 | 1.48749 | 70.45 |
| 23 | 226 | −142.188 | 34.63 | — | — |
| 24 | C01 | ∞ | 3.00 | 1.48745 | 64.84 |
| 25 | C02 | ∞ | — | — | — |

Embodiment 8

Figure 15:
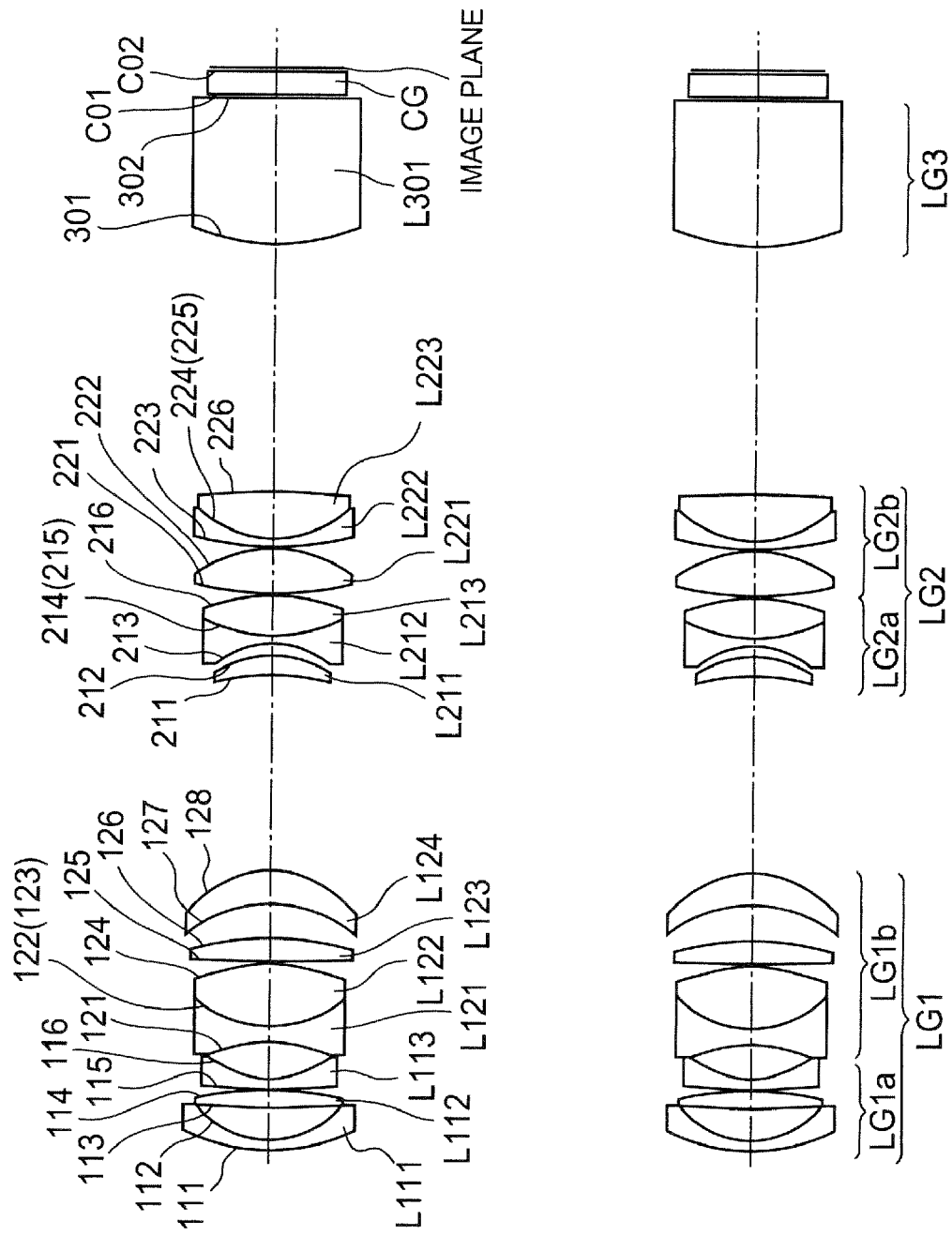
FIG. 15 is a drawing showing the configuration of lens elements of a lens system according to an eighth embodiment of the invention.
Figure 16:
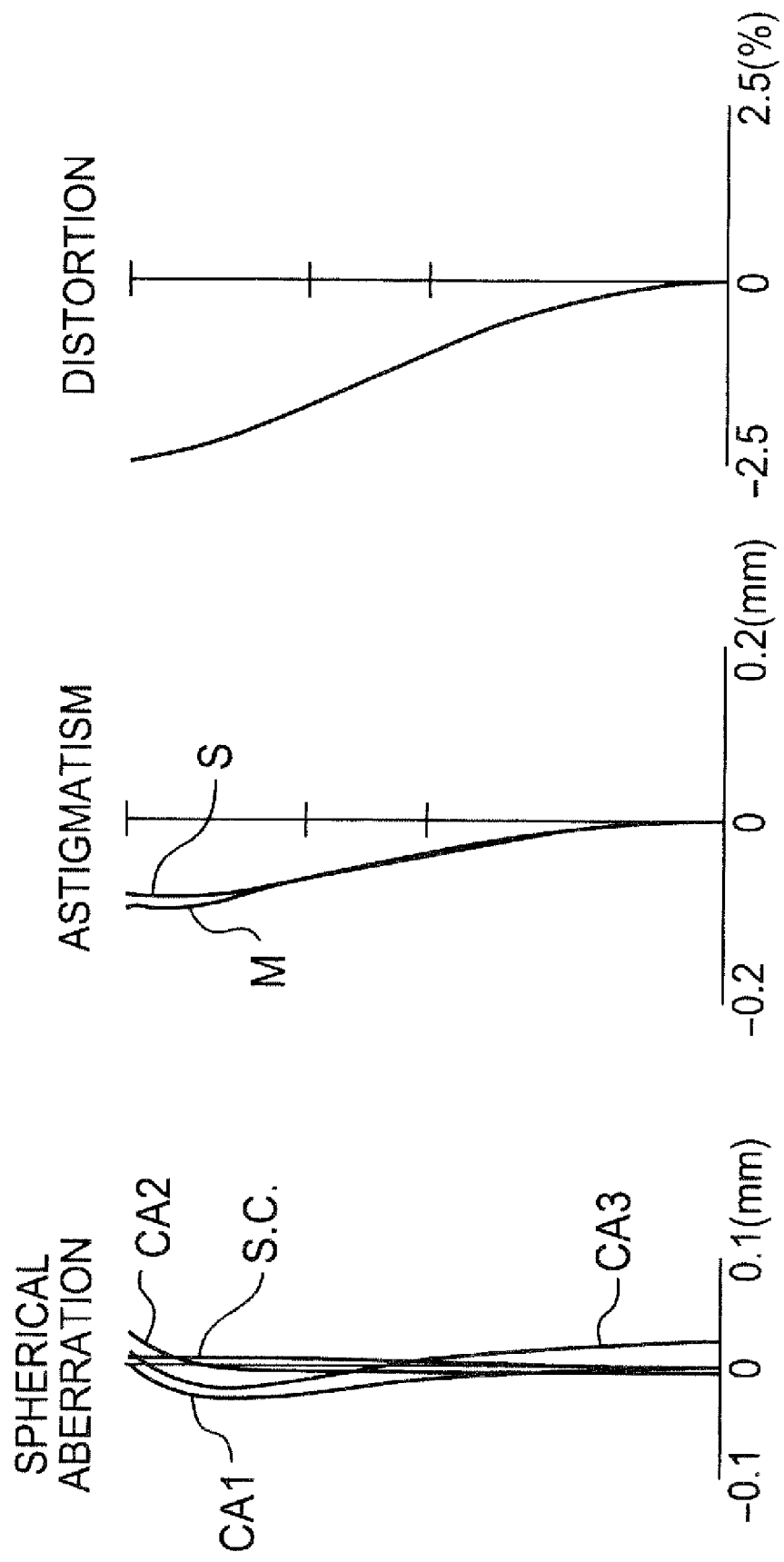
FIG. 16 is a drawing showing aberrations produced by the lens system according to the eighth embodiment.

A numerical example of an eighth embodiment of a lens system of the invention is shown in Table 8. In addition, FIG. 15 is a drawing showing the configuration of the lens system, and FIG. 16 is a drawing showing aberrations thereof.

TABLE 8 f 15.93
$F_{no}$ 2.29
$2\omega$ 66.02

| Serial numbers | Surface numbers | r | d | $n_d$ | $v_d$ |
|---|---|---|---|---|---|
| 1 | 111 | 35.726 | 1.40 | 1.80610 | 33.27 |
| 2 | 112 | 15.882 | 4.44 | — | — |
| 3 | 113 | 182.859 | 2.52 | 1.80518 | 25.46 |
| 4 | 114 | −61.465 | 0.20 | — | — |
| 5 | 115 | 187.732 | 1.20 | 1.80420 | 46.49 |
| 6 | 116 | 15.304 | 5.03 | — | — |
| 7 | 121 | −27.411 | 2.17 | 1.80518 | 25.46 |
| 8 | 122(123) | 18.828 | 8.50 | 1.76182 | 26.61 |
| 9 | 124 | −28.142 | 0.20 | — | — |
| 10 | 125 | 462.242 | 3.15 | 1.80100 | 34.97 |
| 11 | 126 | −54.392 | 4.82 | — | — |
| 12 | 127 | −23.852 | 4.45 | 1.48749 | 70.45 |
| 13 | 128 | −18.669 | 27.33 | — | — |
| 14 | 211 | −35.741 | 2.64 | 1.71300 | 53.93 |
| 15 | 212 | −18.527 | 1.64 | — | — |
| 16 | 213 | −15.366 | 1.00 | 1.80610 | 40.73 |
| 17 | 214(215) | 24.889 | 5.59 | 1.59551 | 39.23 |
| 18 | 216 | −33.161 | 0.20 | — | — |
| 19 | 221 | 54.524 | 6.29 | 1.49700 | 81.61 |
| 20 | 222 | −22.285 | 0.20 | — | — |
| 21 | 223 | 51.035 | 1.20 | 1.80610 | 40.73 |
| 22 | 224(225) | 19.166 | 6.27 | 1.48749 | 70.45 |
| 23 | 226 | −197.696 | 34.00 | — | — |
| 24 | 301 | 35.000 | 20.00 | 1.51680 | 64.20 |
| 25 | 302 | ∞ | 0.63 | — | — |

TABLE 8-continued

| | | f | 15.93 | | |
| | | $F_{no}$ | 2.29 | | |
| | | 2ω | 66.02 | | |
| Serial numbers | Surface numbers | r | d | $n_d$ | $v_d$ |
|---|---|---|---|---|---|
| 26 | C01 | ∞ | 3.00 | 1.48745 | 64.84 |
| 27 | C02 | ∞ | — | — | — |

Next, values corresponding to the conditional expression (1) to conditional expression (19) in the first embodiment to the eighth embodiment are shown in Table 9 altogether.

TABLE 9

| Conditional Expression | Embodiment | | | | | | | |
|---|---|---|---|---|---|---|---|---|
| | 1 | 2 | 3 | 4 | 5 | 6 | 7 | 8 |
| (1) | −0.12 | 0.03 | 0.07 | 0.00 | 0.04 | 0.10 | 0.03 | 0.03 |
| (2) | 0.41 | 0.40 | 0.41 | 0.40 | 0.39 | 0.40 | 0.41 | 0.41 |
| (3) | −1.00 | −1.06 | −1.10 | −1.11 | −1.05 | −1.00 | −1.10 | −1.00 |
| (4) | −0.04 | −0.23 | −0.29 | −0.20 | −0.19 | −0.18 | −0.23 | −0.33 |
| (5) | 0.44 | 0.53 | 0.55 | 0.52 | 0.50 | 0.46 | 0.55 | 0.51 |
| (6) | 2.19 | 2.26 | 2.22 | 2.29 | 2.30 | 2.31 | 2.31 | 2.39 |
| (7) | 0.89 | 0.95 | 0.94 | 0.95 | 0.93 | 0.97 | 0.93 | 1.00 |
| (8) | 18.02 | 16.46 | 18.02 | 18.02 | 18.02 | 18.02 | 15.27 | 14.42 |
| (9) | 1.80 | 1.81 | 1.80 | 1.80 | 1.80 | 1.80 | 1.80 | 1.81 |
| (10) | −1.07 | −1.13 | −1.12 | −1.10 | −1.10 | −1.14 | −1.17 | −1.17 |
| (11) | 22.33 | 21.91 | 18.19 | 17.09 | 19.17 | 19.17 | 18.20 | 18.55 |
| (12) | 0.28 | 0.25 | 0.25 | 0.25 | 0.26 | 0.25 | 0.25 | 0.15 |
| (13) | 31.99 | 23.47 | 23.47 | 23.47 | 29.72 | 23.95 | 23.47 | 13.20 |
| (14) | 0.31 | 0.30 | 0.29 | 0.36 | 0.36 | 0.38 | 0.37 | 0.32 |
| (15) | 1.20 | 1.30 | 1.22 | 1.28 | 1.14 | 1.00 | 1.21 | 1.21 |
| (16) | 0.34 | 0.34 | 0.34 | 0.30 | 0.35 | 0.35 | 0.34 | 0.31 |
| (17) | 38.69 | 38.69 | 38.69 | 32.18 | 33.11 | 33.11 | 38.69 | 35.30 |
| (18) | −0.42 | −0.49 | −0.50 | −0.56 | −0.51 | −0.51 | −0.46 | −0.41 |
| (19) | −4.21 | −1.86 | −1.93 | −1.89 | −1.52 | −1.05 | −1.84 | −2.45 |

As is obvious from Table 9, the numerical values related to the respective examples of the first to eighth embodiments satisfy the conditional expressions (1) to (19), and as is obvious from the aberration drawings of the respective embodiments, the respective aberrations were corrected properly.

What is claimed is:

1. A lens system comprising, sequentially in order from a magnifying side, a first lens group which makes up a substantially afocal optical system as a whole and a second lens group having a positive refractive power as a whole, wherein the first lens group comprises, sequentially in order from a magnifying side, a first sub-lens group (1a) having a negative refractive power as a whole and a second sub-lens group (1b) having a positive refractive power as a whole, wherein the second lens group comprises, sequentially in order from a magnifying side, a first sub-lens group (2a) having a negative refractive power as a whole and a second sub-lens group (2b) having a positive refractive power as a whole, and wherein the following conditional expression (1) is satisfied with respect to a power set for the first lens group, the following conditional expression (2) is satisfied with respect to an afocal magnification set for the first lens group, the following conditional expression (3) is satisfied with respect to a power set for the first sub-lens group (1a) of the first lens group, the following conditional expression (4) is satisfied with respect to a power set for the first sub-lens group (2a) of the second lens group, the following conditional expression (5) is satisfied with respect to a power set for the second sub-lens group (2b) of the second lens group, and the following conditional expression (6) is satisfied with respect to a thickness dimension at an optical axis of the first lens group:

$$-0.3 \leq f/f_I \leq 0.3 \tag{1}$$

$$0.35 \leq h_{IE}/h_{IX} \leq 0.45 \tag{2}$$

$$-1.4 \leq f/f_{Ia} \leq 0.8 \tag{3}$$

$$-0.5 \leq f/f_{IIa} \leq 0.1 \tag{4}$$

$$0.35 \leq f/f_{IIb} \leq 0.65 \tag{5}$$

$$1.9 \leq T_I/f \leq 2.5 \tag{6}$$

where:

f: Composite focal length of the whole lens system;

$f_I$: Composite focal length of the first lens group;

$h_{IE}$: Height of paraxial ray incident onto a magnifying-side surface of a lens element which is disposed outermost on the magnifying side of the first lens group;

$h_{IX}$: Height of a paraxial ray emerging from a contracting-side surface of a lens element which is disposed outermost on a contracting side of the first lens group;

$f_{Ia}$: Composite focal length of the first sub-lens group (1a) of the first lens group;

$f_{IIa}$: Composite focal length of the first sub-lens group (2a) of the second lens group;

$f_{IIb}$: Composite focal length of the second sub-lens group (2b) of the second lens group; and $T_I$: Distance on the optical axis between the magnifying-side surface of the lens element which is disposed outermost on the magnifying side of the first lens group to the contracting-side surface of the lens element which is disposed outermost on the contracting side of the first lens group.

2. A lens system as set forth in claim 1, wherein the first sub-lens group (1a) of the first lens group comprises three lens elements, sequentially in order from a magnifying side: (i) a negative lens element, which is formed into a meniscus shape which is convex on a magnifying side thereof and which has a negative refractive power, (ii) a positive lens element, which has a positive refractive power, and (iii) a negative lens element, and wherein the following conditional expression (7) is satisfied with respect to a shape of a contracting-side surface of the lens element which is disposed outermost on the magnifying side of the first sub-lens group (1a) of the first lens group, the following conditional expression (8) is satisfied with respect to dispersion properties of a glass material used for each of the lens elements of the first sub-lens group (1a) of the first lens group, and the following expression (9) is satisfied with respect to a refractive index of the glass material used for each of the lens elements of the first sub-lens group (1a) of the first lens group:

$$0.7 \leq R_{Ia2}/f \leq 1.3 \tag{7}$$

$$10 \leq V_{IaN} - V_{Iap} \tag{8}$$

$$1.7 \leq N_{Ia} \tag{9}$$

where:

$R_{Ia2}$: Radius of curvature of the contracting-side surface of the lens element which is disposed outermost on the magnifying side of the first sub-lens group (1a) of the first lens group;

$V_{IaN}$: Mean value of Abbe numbers of the negative lens elements of the first sub-lens group (1a) of the first lens group;

$V_{IaP}$: Abbe number of the positive lens element of the first sub-lens group (1a) of the first lens group; and $N_{Ia}$: Mean value of refractive indices of the lens elements of the first sub-lens group (1a) of the first lens group relative to the d line.

3. A lens system as set forth in claim 1, wherein the second sub-lens group (1b) of the first lens group comprises four lens elements in total, including a negative lens element, a positive lens element, another a positive lens element, and a further positive lens element, which has a meniscus shape which is convex on a contracting side thereof, and wherein the following conditional expression (10) is satisfied with respect to a shape of a contracting-side surface of the lens element which is disposed fourth outermost from a magnifying side of the second sub-lens group (1b) of the first lens group, and the following conditional expression (11) is satisfied with respect to dispersion properties of a glass material used for each lens element which makes up a cemented lens disposed on the magnifying side of the second sub-lens group (1b) of the first lens group:

$$-1.5 \leq R_{Ib7}/f \leq -0.9 \quad (10)$$

$$10 \leq V_{IbP} - V_{IbN} \quad (11)$$

where:

$R_{Ib7}$: Radius of curvature of the contracting-side surface of the lens element which is disposed fourth outermost from the magnifying side of the second sub-lens group (1b) of the first lens group;

$V_{IbP}$: Mean value of Abbe numbers of the positive lens elements of the second sub-lens group (1b) of the first lens group; and $V_{IbN}$: Abbe number of the negative lens element of the second sub-lens group (1b) of the first lens group.

4. A lens system as set forth in claim 1, wherein the first sub-lens group (2a) of the second lens group (i) comprises two lens elements, including a positive lens element and a negative lens element, or (ii) comprises three lens elements in total, including a positive lens element, a negative lens element, and another positive lens element, and wherein the following conditional expressions (12) is satisfied with respect to a refractive index of a glass material used for each of the lens elements of the first sub-lens group (2a) of the second lens group, the following conditional expression (13) is satisfied with respect to dispersion properties of the positive lens element which is disposed outermost on a magnifying side of the first sub-lens group (2a) of the second lens group and the negative lens element which is disposed second outermost from the magnifying side of the first sub-lens group (2a) of the second lens group, the following conditional expression (14) is satisfied with respect to a power set for the lens element which is disposed outermost on the magnifying side of the first sub-lens group (2a) of the second lens group, and the following conditional expression (15) is satisfied with respect to a shape of a contracting-side surface of the lens element which is disposed outermost on the magnifying side of the first sub-lens group (2a) of the second lens group and a shape of a magnifying-side surface of the lens element which is disposed second outermost from the magnifying side of the first sub-lens group (2a) of the second lens group:

$$0.1 \leq N_{IIaN} - N_{IIaP} \quad (12)$$

$$10 \leq V_{IIa1} - V_{IIa2} \quad (13)$$

$$0.2 \leq f/f_{IIa1} \leq 0.5 \quad (14)$$

$$0.8 \leq R_{IIa2}/R_{IIa3} \leq 1.5 \quad (15)$$

where:

$N_{IIaN}$: Refractive index of the negative lens element of the first sub-lens group (2a) of the second lens group relative to the d line;

$N_{IIaP}$: Refractive index of the positive lens element, or mean value of refractive indices of the positive lens elements, of the first sub-lens group (2a) of the second lens group relative to the d line;

$V_{IIa1}$: Abbe number of the lens element which is disposed outermost on the magnifying side of the lens elements of the first sub-lens group (2a) of the second lens group;

$V_{IIa2}$: Abbe number of the lens element which is disposed second outermost from the magnifying side of the lens elements of the first sub-lens group (2a) of the second lens group;

$f_{IIa1}$: Focal length of the lens element which is disposed outermost on the magnifying side of the lens elements of the first sub-lens group (2a) of the second lens group;

$R_{IIa2}$: Radius of curvature of the contracting-side surface of the lens element which is disposed outermost on the magnifying side of the lens elements of the first sub-lens group (2a) of the second lens group; and $R_{IIa3}$: Radius of curvature of the magnifying-side surface of the lens element which is disposed second outermost from the magnifying side of the lens elements of the first sub-lens group (2a) of the second lens group.

5. A lens system as set forth in claim 1, wherein the second sub-lens group (2b) of the second lens group comprises three lens elements in total, including a positive lens element, a negative lens element, and another positive lens element, and wherein the following conditional expressions (16) and (17) are satisfied with respect to refractive index and dispersion properties of a glass material used for each of the lens elements of the second sub-lens group (2b) of the second lens group, respectively, the following conditional expression (18) is satisfied with respect to a power set for the lens element which is disposed second outermost from a magnifying side of the second sub-lens group (2b) of the second lens group, and the following conditional expression (19) is satisfied with respect to a shape of a magnifying-side surface and a shape of a contracting-side surface of the lens element which is disposed outermost on the magnifying side of the second sub-lens group (2b) of the second lens group:

$$0.15 \leq N_{IIbN} - N_{IIbP} \quad (16)$$

$$20 \leq V_{IIbP} - V_{IIbN} \quad (17)$$

$$-0.75 \leq f/f_{IIb2} \leq -0.25 \quad (18)$$

$$-6.0 \leq R_{IIb1}/R_{IIb2} \leq -0.8 \quad (19)$$

where:

$N_{IIbN}$: Refractive index of the negative lens element of the second sub-lens group (2b) of the second lens group relative to the d line;

$N_{IIbP}$: Mean value of refractive indices of the positive lens elements of the second sub-lens group (2b) of the second lens group relative to the d line;

$V_{IIbP}$: Mean value of Abbe numbers of the positive lens elements of the second sub-lens group (2b) of the second lens group;

$V_{IIbN}$: Abbe number of the negative lens element of the second sub-lens group (2b) of the second lens group;

$f_{IIb2}$: Focal length of the lens element which lies second outermost from the magnifying side of the lens elements of the second sub-lens group (2b) of the second lens group;

$R_{IIb1}$: Radius of curvature of the magnifying-side surface of the lens element which is disposed outermost on the magnifying side of the second-sub-lens group (2b) of the second lens group; and $R_{IIb2}$: Radius of curvature of the contracting-side surface of the lens element which is disposed outermost on the magnifying side of the second sub-lens group (2b) of the second lens group.

6. A lens system as set forth in claim 1, wherein an adjustment of a focal point of the whole lens system is implemented by shifting the second lens group in an optical direction thereof.

7. A lens system as set forth in claim 2, wherein an adjustment of a focal point of the whole lens system is implemented by shifting the second lens group in an optical direction thereof.

8. A lens system as set forth in claim 3, wherein an adjustment of a focal point of the whole lens system is implemented by shifting the second lens group in an optical direction thereof.

9. A lens system as set forth in claim 4, wherein an adjustment of a focal point of the whole lens system is implemented by shifting the second lens group in an optical direction thereof.

10. A lens system as set forth in claim 5, wherein an adjustment of a focal point of the whole lens system is implemented by shifting the second lens group in an optical direction thereof.

11. A lens system as set forth in claim 1, wherein a third lens group comprising a single positive lens is provided in the vicinity of a light valve in an airspace between the second lens group and the light valve.

12. A lens system as set forth in claim 2, wherein a third lens group comprising a single positive lens is provided in the vicinity of a light valve in an airspace between the second lens group and the light valve.

13. A lens system as set forth in claim 3, wherein a third lens group comprising a single positive lens is provided in the vicinity of a light valve in an airspace between the second lens group and the light valve.

14. A lens system as set forth in claim 4, wherein a third lens group comprising a single positive lens is provided in the vicinity of a light valve in an airspace between the second lens group and the light valve.

15. A lens system as set forth in claim 5, wherein a third lens group comprising a single positive lens is provided in the vicinity of a light valve in an airspace between the second lens group and the light valve.

16. A lens system as set forth in claim 6, wherein a third lens group comprising a single positive lens is provided in the vicinity of a light valve in an airspace between the second lens group and the light valve.

17. A projector installing the lens system set forth in claim 1.

18. A projector installing the lens system set forth in claim 2.

19. A projector installing the lens system set forth in claim 3.

20. A projector installing the lens system set forth in claim 4.

* * * * *